(12) United States Patent
Fourney

(10) Patent No.: US 7,770,718 B2
(45) Date of Patent: Aug. 10, 2010

(54) SYSTEMS AND METHODS FOR PROVIDING AN IMPROVED TIMING CONVEYOR

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 705 days.

(21) Appl. No.: 11/610,737

(22) Filed: Dec. 14, 2006

(65) Prior Publication Data

US 2008/0264757 A1   Oct. 30, 2008

Related U.S. Application Data

(63) Continuation-in-part of application No. 11/203,711, filed on Aug. 15, 2005, now Pat. No. 7,311,192.

(51) Int. Cl.
*B65G 17/00* (2006.01)
*B65G 17/24* (2006.01)
*B65G 17/06* (2006.01)
*B65G 17/38* (2006.01)
*B65G 29/00* (2006.01)

(52) U.S. Cl. ............... 198/803.9; 198/779; 198/850; 198/853; 198/463.3

(58) Field of Classification Search .............. 198/779, 198/850, 853

See application file for complete search history.

(56) References Cited

U.S. PATENT DOCUMENTS

| | | | | |
|---|---|---|---|---|
| 3,604,554 A | * | 9/1971 | Martz | ............ 198/634 |
| 5,860,505 A | * | 1/1999 | Metzger | ............ 198/463.4 |
| 6,230,872 B1 | * | 5/2001 | Huang et al. | ............ 198/368 |
| 6,318,544 B1 | * | 11/2001 | O'Connor et al. | ............ 198/853 |
| 6,390,285 B2 | | 5/2002 | de Geus et al. | |
| 6,758,323 B2 | | 7/2004 | Costanzo | |
| 7,506,750 B2 | | 3/2009 | Costanzo | |
| 2006/0011453 A1 | * | 1/2006 | Sedlacek | ............ 198/779 |
| 2006/0151304 A1 | | 7/2006 | Ozaki | |

OTHER PUBLICATIONS

International Search Report, dated Sep. 29, 2008.

* cited by examiner

*Primary Examiner*—Gene Crawford
*Assistant Examiner*—Yolanda Cumbess
(74) *Attorney, Agent, or Firm*—Thomas, Kayden, Horstemeyer & Risley, LLP

(57) ABSTRACT

A conveyor includes a conveyor belt, a plurality of rollers, and a flight. The rollers have lower surfaces configured to engage a roller-engagement surface, and upper surfaces that substantially form a plane, such that the rollers engage the roller-engagement surface and rotate to move an object supported by the rollers over the plane. The flight includes a cam configured to engage a cam surface below the conveyor belt to impart a moment on the flight, and a projection that responds to the moment by rotating from a retracted position to an extended position.

21 Claims, 17 Drawing Sheets

US 7,770,718 B2

SYSTEMS AND METHODS FOR PROVIDING AN IMPROVED TIMING CONVEYOR

CROSS-REFERENCE TO RELATED APPLICATIONS

This application is a continuation-in-part of copending U.S. utility application entitled, "Systems and Methods for Providing an Improved Timing Conveyor," having Ser. No. 11/203,711, filed Aug. 15, 2005, which is entirely incorporated herein by reference.

BACKGROUND

When conveying objects in a conveyor system, it is often necessary to arrange the objects in a known, relative position or to maintain minimum spacing on the conveyor belt. Prior art devices for addressing this need have utilized a multiplicity of sensors in combination with actuatable package-stopping components. One such device is described in U.S. Pat. No. 6,648,125 to Bershadsky, which is hereby incorporated by reference. Other methods of achieving conveyor spacing include standard conveyor belts having overhead or bottom mounted spacing bars, which travel at a different, usually slower, speed from the belt. These devices are complex and diminish conveyor efficiency as a result of slowing or stopping packages along the conveyor path. Thus, a heretofore unaddressed need exists in the industry to address the aforementioned deficiencies and inadequacies.

SUMMARY

In one embodiment, a conveyor includes a conveyor belt, a plurality of rollers, and a flight. The rollers have lower surfaces configured to engage a roller-engagement surface, and upper surfaces that substantially form a plane, such that the rollers engage the roller-engagement surface and rotate to move an object supported by the rollers over the plane. The flight includes a cam configured to engage a cam surface below the conveyor belt to impart a moment on the flight, and a projection that responds to the moment by rotating from a retracted position to an extended position.

In one embodiment, a conveyor includes a conveyor belt, a plurality of rollers, and a flight. The conveyor belt is configured to move in a direction of belt travel at a speed of the conveyor belt with respect to the ground. The plurality of rollers are configured to rotate in the direction of belt travel. The rotation of the rollers causes an object on the conveyor belt to move over the rollers at an increased speed with respect to the ground. The flight has a cam and a projection. The cam imparts a moment on the projection to rotate the projection from a retracted position to an extended position.

In one embodiment, a conveyor includes a conveyor belt, a plurality of rollers, a positioning component, and a roller engagement surface. The conveyor belt is configured to move in the direction of belt travel, such that objects placed on the conveyor belt are conveyed with the conveyor belt in the direction of belt travel. The plurality of rollers are coupled to the conveyor belt and are configured to rotate in the direction of belt travel, such that objects placed on the conveyor belt in contact with the rotating rollers move with respect to the conveyor belt along the rotating rollers in the direction of belt travel. The positioning component is coupled to the conveyor belt and is configured to halt the object with respect to the conveyor belt, such that the object is conveyed with the conveyor belt in the direction of belt travel. The roller-engagement surface is positioned adjacent the conveyor belt and is configured to engage the rollers to rotate the rollers, the roller-engagement surface being configured to move in a direction opposite from the direction of belt travel.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
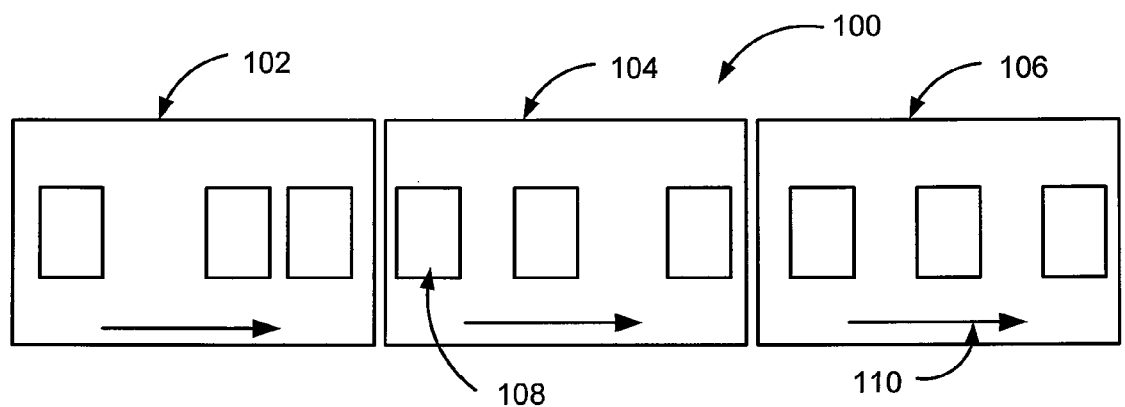
FIG. 1 is a block diagram illustrating a top view of an embodiment of a conveyor system utilizing a timing conveyer, as disclosed herein.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications, and equivalents included within the spirit and scope of the disclosure as defined by the appended claims.

Reference is now made to FIG. 1, which is a block diagram illustrating a top view of an embodiment of a conveyor system utilizing a timing conveyor. The conveyor system 100 includes a feeder conveyor 102, timing conveyor 104, and a receiving conveyor 106. Each of these conveyors are utilized to transfer objects 108 in a belt travel direction 110. The objects 108 on the feeder conveyor 102 may be conveyed at random spacings or intervals. The objects 108 that transition from the feeder conveyor 102 to the timing conveyor 104 are repositioned by the timing conveyor 104 such that the receiving conveyor 106 receives the objects 108 at predetermined intervals. The predetermined intervals facilitate subsequent conveyor processes such as single-lane timing, side-by-side in-phase timing, side-by-side out-of-phase timing, and non-parallel merging.

Figure 2A:
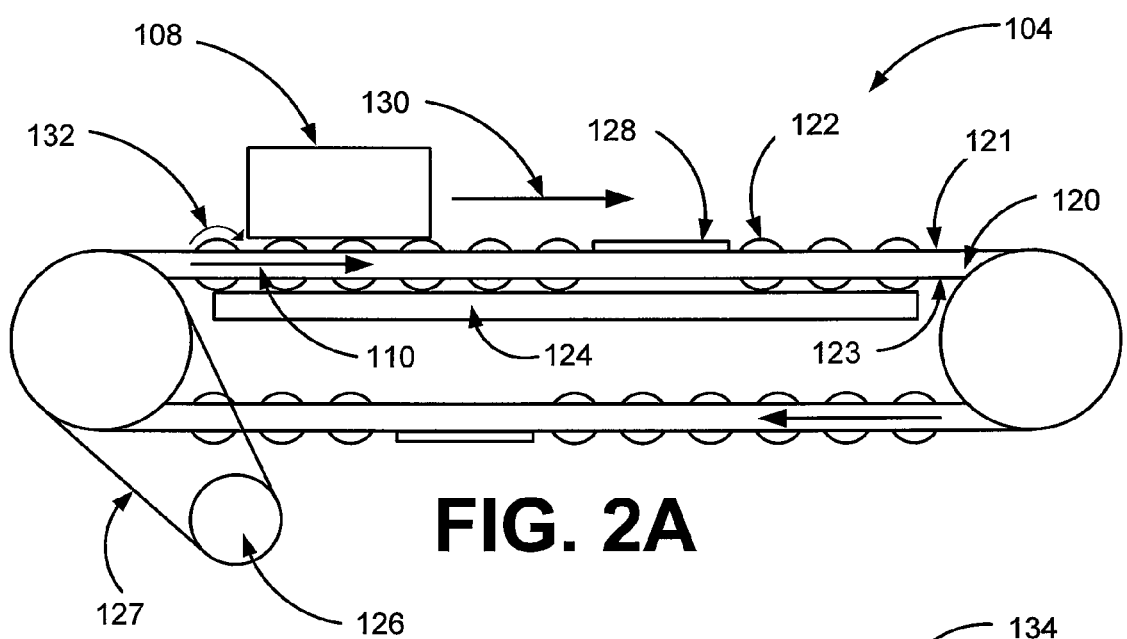
FIGS. 2A and 2B are block diagrams illustrating side views of an embodiment of a timing conveyor as disclosed herein at two different stages of processing.
Figure 2B:
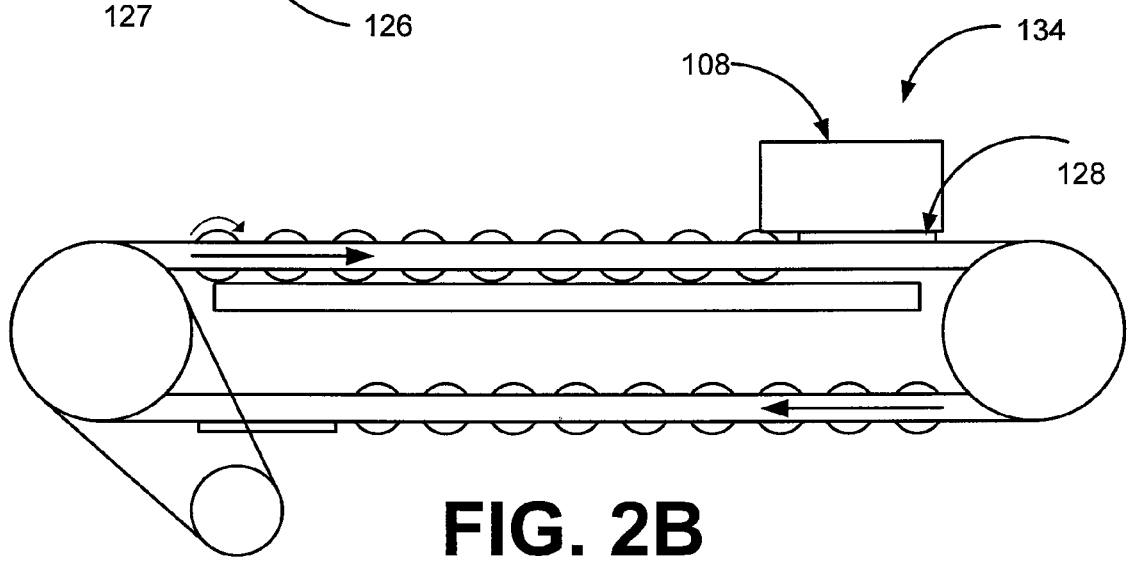

Reference is now made to FIGS. 2A and 2B, which are block diagrams illustrating side views of an embodiment of a timing conveyor at two different stages of processing. The timing conveyor 104 generally includes acceleration components and positioning components. This embodiment of the timing conveyor 104 includes a conveyor belt 120 having cavities (not shown here), that contain rollers 122, which are accelerating components. A non-limiting example of a conveyor belt 120 is a mat-top chain, as disclosed in U.S. Pat. No. 6,494,312 to Costanzo, which is hereby incorporated by reference. The rollers 122 are dimensioned and positioned such that each roller extends above a top surface 121 of the conveyor belt 120 and below a bottom surface 123 of the conveyor belt 120. The rollers 122 can be arranged in a non-limiting exemplary configuration of columns and rows. The rollers 122 are aligned within the conveyor belt to accelerate objects in the belt travel direction 110. The timing conveyor 104 also includes, as exemplary positioning components, friction pads 128, that are placed at specific intervals along the top surface 121 of the conveyor belt 120. A roller-engagement surface 124 is positioned under the conveyor belt 120 such that the rollers 122 contact the roller-engagement surface 124. The roller-engagement surface 124 can be a generally planar component and can include a top surface having a high coefficient of friction. A rubber or rubber-type compound is one non-limiting example of material having a high coefficient of friction. The timing conveyor 104 also includes a conveyor drive component 126. Although the conveyor drive component 126, as illustrated in FIGS. 2A and 2B, is shown as an externally mounted rotary-drive component that is mechanically coupled to the conveyor belt 120 using a belt or a chain 127, the conveyor drive component 126 can take many different forms within the scope and spirit of this disclosure. For example, the conveyor drive component 126 may be coupled directly to the timing conveyor 104 or may be mechanically coupled using other techniques including, but not limited to, gearboxes, drive shafts, and universal joints.

As shown in FIG. 2A, as the conveyor belt 120 moves in the belt travel direction 110, the rollers 122 contact the roller-engagement surface 124. The frictional engagement between the rollers 122 and the roller-engagement surface 124 cause roller rotation 132. When an object 108 is supported by a roller 122, the roller rotation 132 causes the object 108 to achieve a speed 130 relative to the conveyor belt 120 that equals the speed of the conveyor belt 120 relative to the roller-engagement surface 124, such that the object 108 moves at twice the speed of the conveyor belt 120. The object 108 moves along the conveyor belt 120 until it reaches a friction pad 128. In this way, each object 108 advances to a designated position 134, as illustrated in FIG. 2B. The designated position 134 generally corresponds to and is determined by the location of the friction pad 128. The friction pad 128 is a non-limiting example of numerous types of positioning components contemplated within the scope and spirit of this disclosure. Additionally, a timing conveyor 104 can be configured in different lengths that can include different quantities of designated positions 134.

Figure 3:
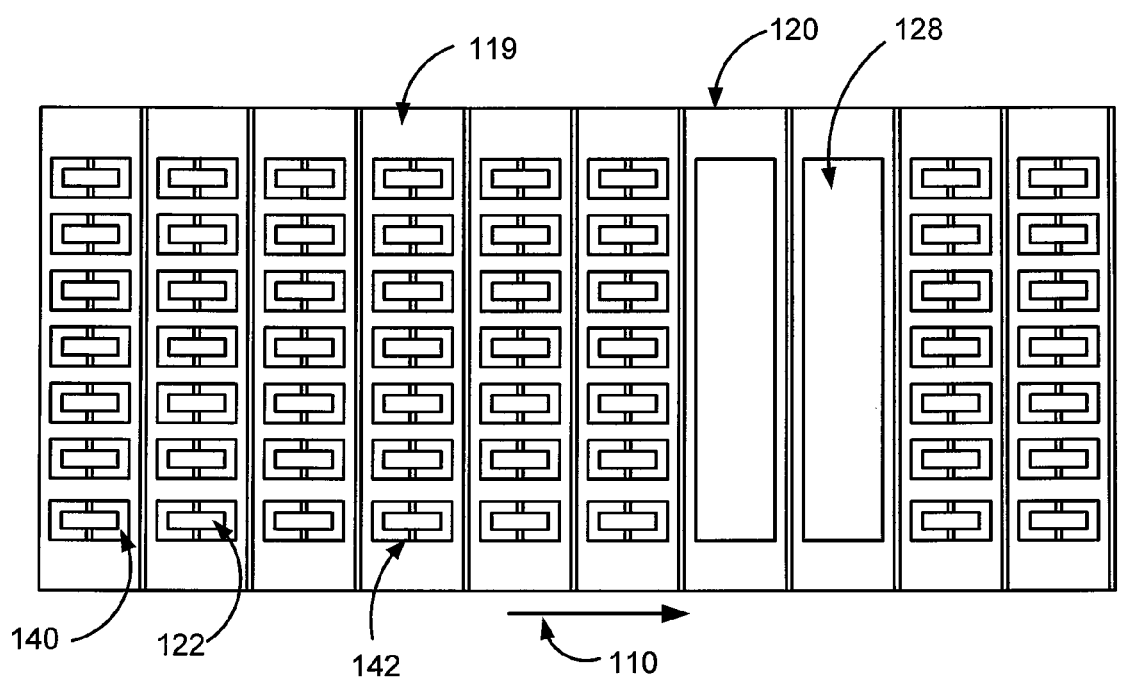
FIG. 3 is a block diagram illustrating a top partial view of a conveyor in an embodiment, as disclosed herein.

Reference is now made to FIG. 3, which is a block diagram illustrating a top partial view of a conveyor belt in an embodiment. In the embodiment of FIG. 3, the conveyor belt 120 comprises a mat-top chain that includes multiple chain segments 119 hingeably secured to one another to form a conveyor loop. The chain segments 119, which can be mat-top chain segments, include multiple cavities 140, which can receive rollers 122 mounted on axles 142, for example. The chain segments 119 can also receive friction pads 128. As discussed above in reference to FIGS. 2A and 2B, the rollers 122, by virtue of contact with the roller-engagement surface 124, cause an object to move relative to the conveyor belt 120 in the belt travel direction 110. When the object reaches the chain segments 119 having friction pads 128 the motion of the object relative to the conveyor belt 120 is halted. In this manner, the locations of friction pads 128, or alternative positioning components, determine the ultimate spacing between conveyed objects.

Figure 4:
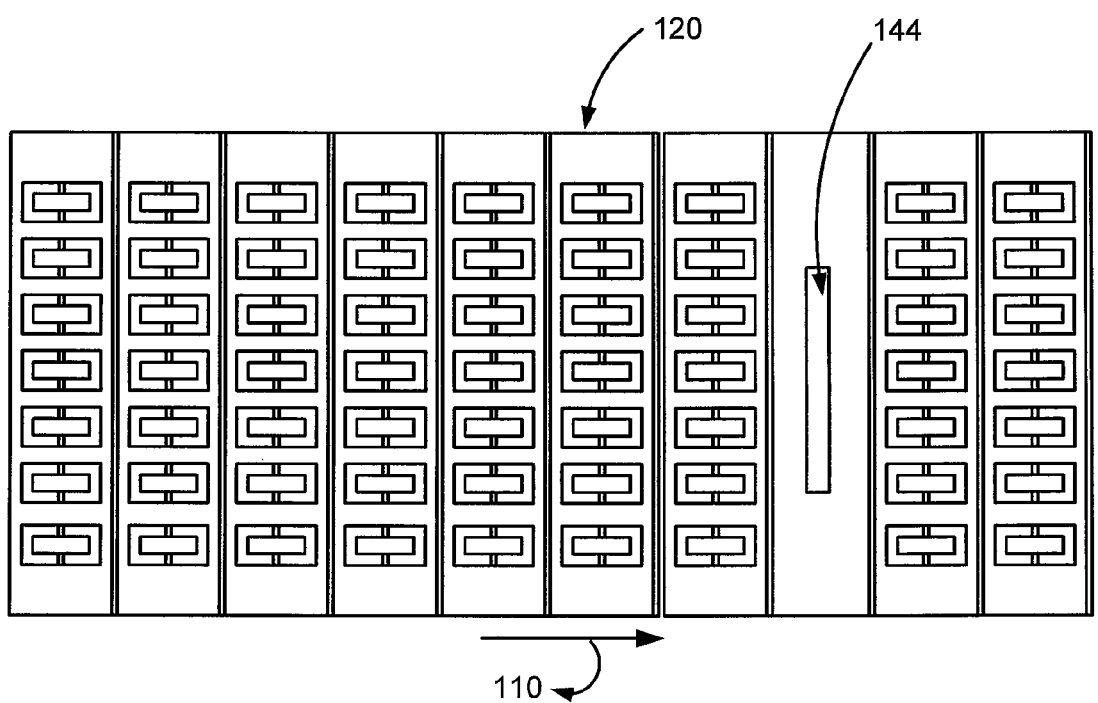
FIG. 4 is a block diagram illustrating a top partial view of a conveyor in another embodiment, as disclosed herein.

Reference is now made to FIG. 4, which is a block diagram illustrating a top partial view of a conveyor in another embodiment. In this embodiment, the positioning component on the conveyor belt 120 is a flight 144. A flight 144 can be generally described as a stop mounted along or on a conveyor that interferes with the movement of an object relative to the conveyor at a specific point along the conveyor. In contrast with the friction pad discussed above in reference to FIG. 3, the flight 144 is not generally co-planar with the surface created by the rollers 122 and, instead, extends above the plane created by the rollers 122. Extending above the plane defined by the tops of the rollers, the flight 144 provides a relatively inflexible stopping position for the object on the conveyor. A flight 144, in contrast with friction pads 128, may provide for a more precisely controlled designated position. Additionally, unlike a friction pad 128, the designated position using a flight 144 is less likely to vary with conveyor speed. Depending on the nature of the objects on the conveyor, the friction pad 128 may be more desirable because of the rate of deceleration is less than that associated with using a flight 144. The positioning component can be implemented as a friction pad, a flight, a combination thereof, or other suitable component.

Figure 5A:
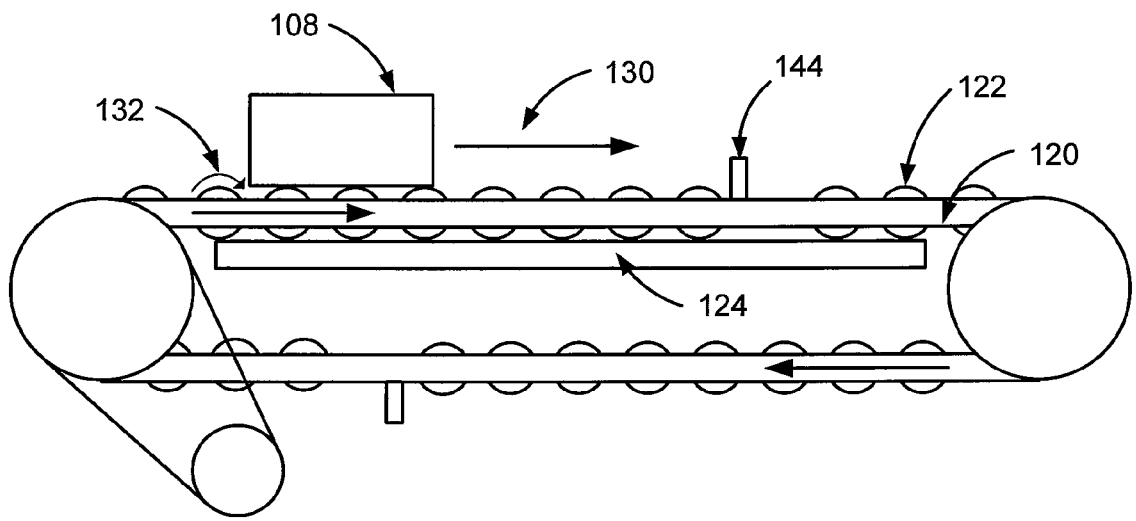
FIGS. 5A and 5B are block diagrams illustrating side views of another embodiment of a timing conveyor as disclosed herein at two different stages of processing.
Figure 5B:
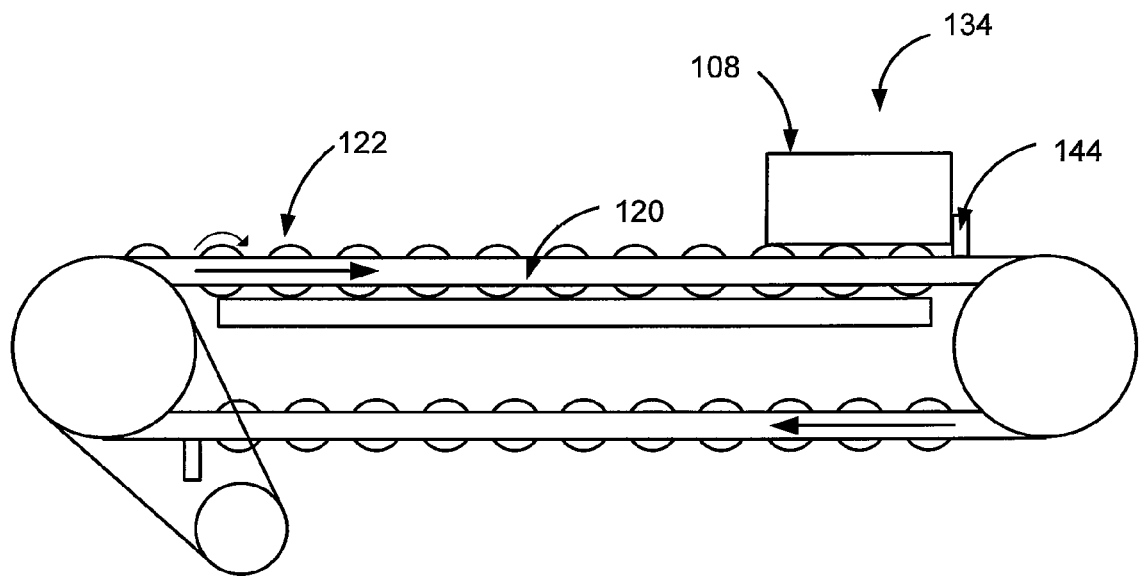

Reference is now made to FIGS. 5A and 5B, which are block diagrams illustrating side views of another embodiment of a timing conveyor at two different stages of processing. As shown in FIG. 5A, the object 108 is moving at a relative speed 130 via engagement with the rollers 122. As shown in FIG. 5B, when the object 108 reaches the designated position 134, as defined by the flight 144, the object 108 is halted relative to the conveyor belt 120. In this manner, each of the objects conveyed will exit the timing conveyor at an interval determined by the distance between the flights 144.

Figure 6:
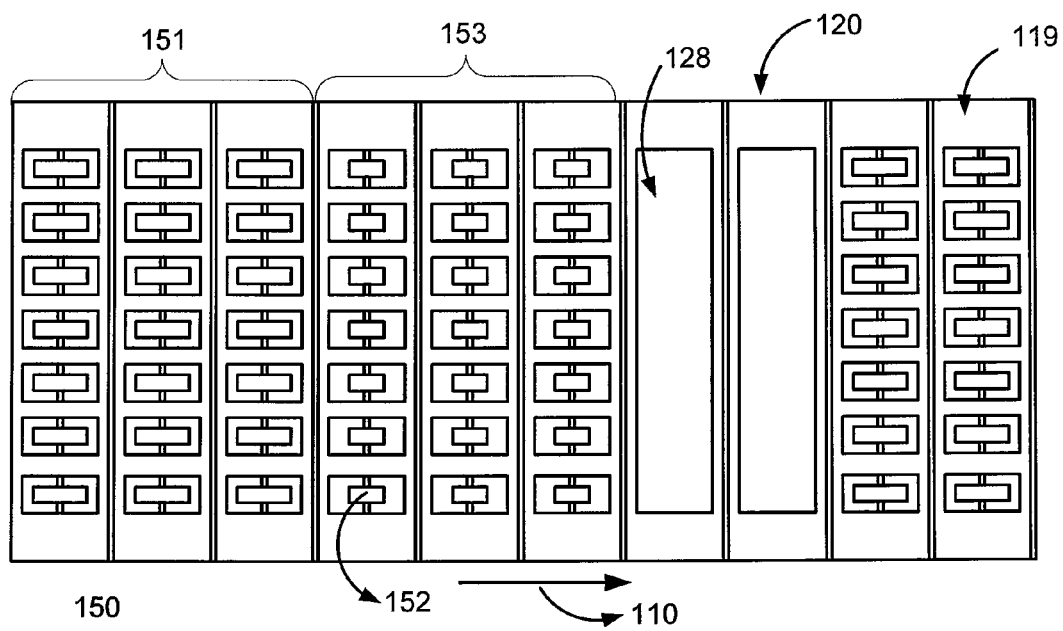
FIG. 6 is a block diagram illustrating a top partial view of another embodiment of a conveyor, as disclosed herein.

Reference is now made to FIG. 6, which is a block diagram illustrating a top partial view of another embodiment of a conveyor. The conveyor belt 120 can include multiple chain segments 119 that can have either rollers or positioning components such as, for example, friction pads 128. The conveyor belt 120 includes a high-engagement zone 151 and a low-engagement zone 153. A high-engagement zone 151 is generally characterized by a substantial frictional engagement between the rollers 150 and the conveyed object 108 such that slippage between the rollers 150 and the conveyed object 108 is reduced or eliminated. Similarly, a low-engagement zone 153 is generally characterized by a reduced level of frictional engagement between the rollers 152 and the conveyed object 108, relative to the high-engagement zone 151. Accordingly, slippage between the rollers 152 and the conveyed object 108 is increased relative to the slippage experienced in the high-engagement zone 151.

The high-engagement zone 151 is configured with rollers 150 designed to increase the frictional engagement with the conveyed object 108 by reducing or eliminating slippage between the rollers 150 and the conveyed object 108. One technique for reducing or eliminating slippage is the use of large rollers 150. Additionally or alternatively, the high-engagement zone 151 can utilize rollers 150 having surfaces with a relatively large friction coefficient to provide a greater frictional engagement between the roller 150 and the conveyed object 108. Similarly, the low-engagement zone 153 can utilize small rollers 152 and/or rollers having a surface with a relatively low friction coefficient. Small rollers 152 and/or low friction coefficient rollers permit the conveyed object 108 to slip on the rollers both during deceleration and after the conveyed object 108 stops relative to the conveyor. Optionally, the conveyor belt 120 can include more than two levels of engagement where the different levels of engagement can be achieved through the use of different sized rollers, rollers having different friction coefficients, and any combination thereof.

Figure 7:
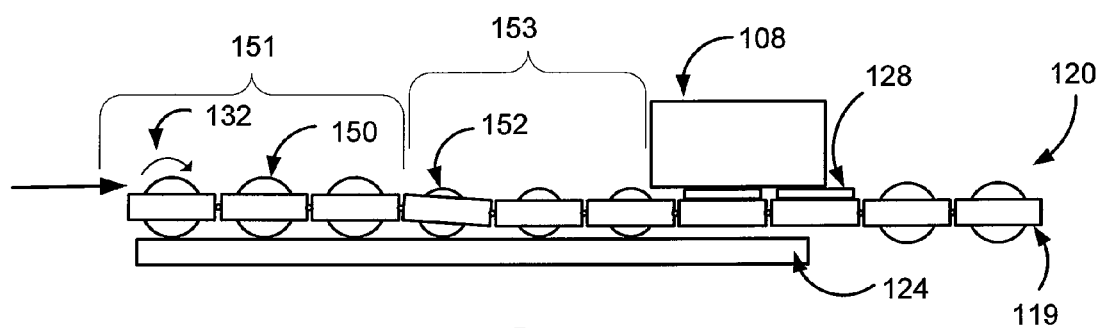
FIG. 7 is a block diagram illustrating a side view of the embodiment of FIG. 6.
Figure 8:
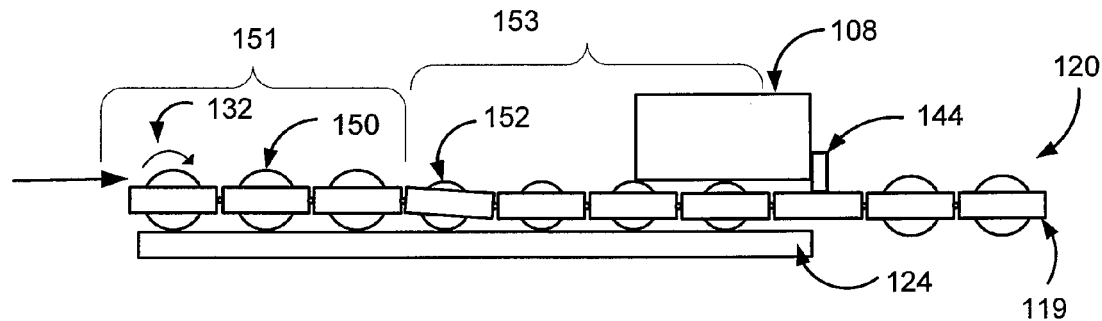
FIG. 8 is a block diagram illustrating a side view of another embodiment of a conveyor, as disclosed herein.

Reference is made to FIG. 7, which is a block diagram illustrating a side view of an embodiment as illustrated in FIG. 6. The conveyor belt 120 includes a high-engagement zone 151 having large rollers 150 and a low-engagement zone 153 having small rollers 152. As discussed above in reference to FIG. 6, the low-engagement zone 153 may also feature rollers having a lower coefficient of friction thereby permitting slippage between the roller and the object as the object decelerates through contact with the friction pad 128. As illustrated, the flexible nature of the conveyor belt 120 allows both the large rollers 150 and the small rollers 152 to engage the roller-engagement surface 124. In this manner rollers 150, 152 in both the high-engagement zone 151 and the low-engagement zone 153 experience rotation via contact with the roller-engagement surface 124. As shown in FIG. 8, which is a block diagram illustrating a side view of another embodiment of a conveyor belt 120, the multiple-engagement zone concept can also be implemented using a flight 144 as the positioning component. The flight 144 can be implemented in various different ways. For example, the flight 144 may be configured as a fixed-position structure that maintains an extended position on the conveyor. Alternatively, the flight 144 can be a moveable flight that is actuatable at, for example, one or more specific locations along the conveyor path.

Figure 9:
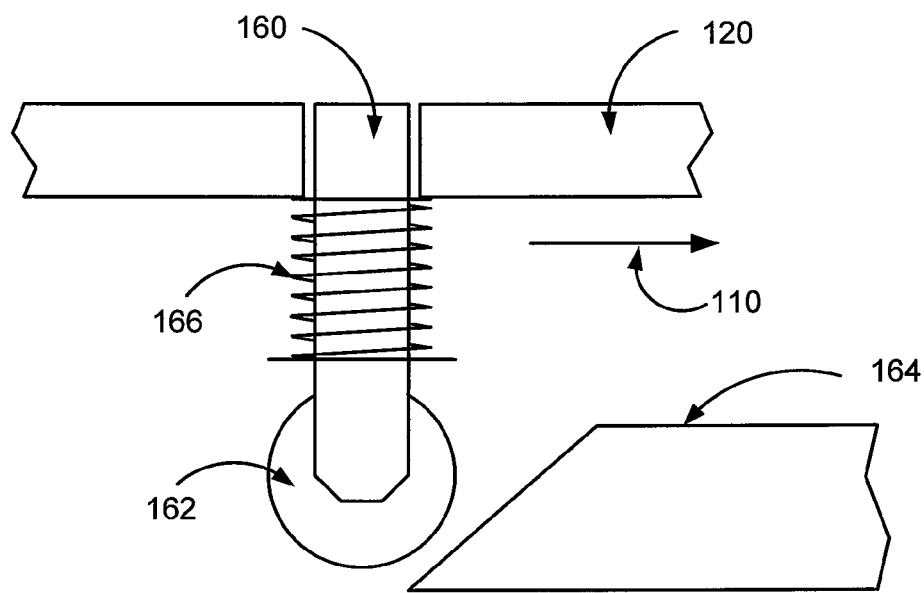
FIG. 9 is a partial side view of an embodiment of a linearly actuatable flight in the retracted position, as disclosed herein.
Figure 10:
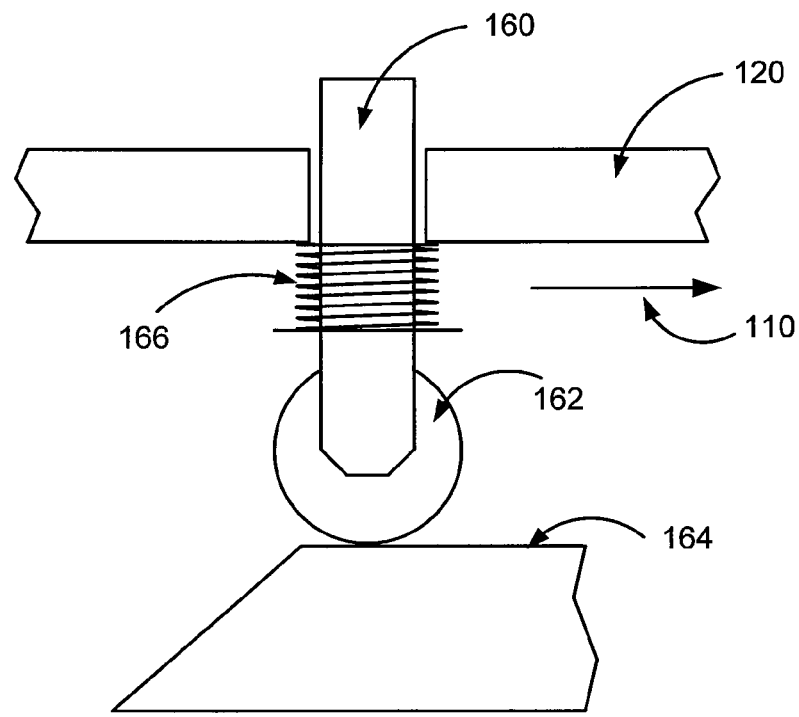
FIG. 10 is a partial side view of an embodiment of a linearly actuatable flight in the extended position, as disclosed herein.

Reference is made to FIG. 9, which is a partial side view of an embodiment of a linearly actuatable flight in the retracted position. The linearly actuatable flight 160 is secured to the conveyor belt 120 and does extend above the surface of the conveyor belt 120 in the retracted position. The linearly actuatable flight 160 includes a cam roller 162 and optionally includes a biasing element 166 for maintaining a retracted position when the linearly actuatable flight 160 is not actuated. As the conveyor belt 120 moves in the belt travel direction 110 the cam roller 162 engages a cam surface 164 and vertically displaces the flight 160 to a position extended above the plane defined by the top surface of the adjacent rollers 152. In a non-limiting example, the cam surface 164 can be the roller-engagement surface or a designated surface of the roller-engagement surface. Alternatively, the cam surface 164 can be a separate structure for actuating the flight 160 and, further, can be adjustable to provide independent control of the flight position. As shown in FIG. 10, which is a partial side view of an embodiment of a linearly actuatable flight in the extended position, the cam roller 162 engages the cam surface 164 and displaces the linearly actuatable flight 160 to a position extended above the conveyor belt 120. While the engagement of the cam roller 162 is sufficient to extend the linearly actuatable flight 160 when unimpeded, the actuation of the flight 160 may not be performed with the force necessary to extend in the event a conveyed object is placed over the linearly actuatable flight 160. Alternatively (not shown), the linearly actuatable flight 160 can be configured to include a multi-piece telescopically-configured assembly that includes an internal biasing element where the multiple pieces collapse if the linearly actuatable flight 160 is actuated under a conveyed object.

Figure 11:
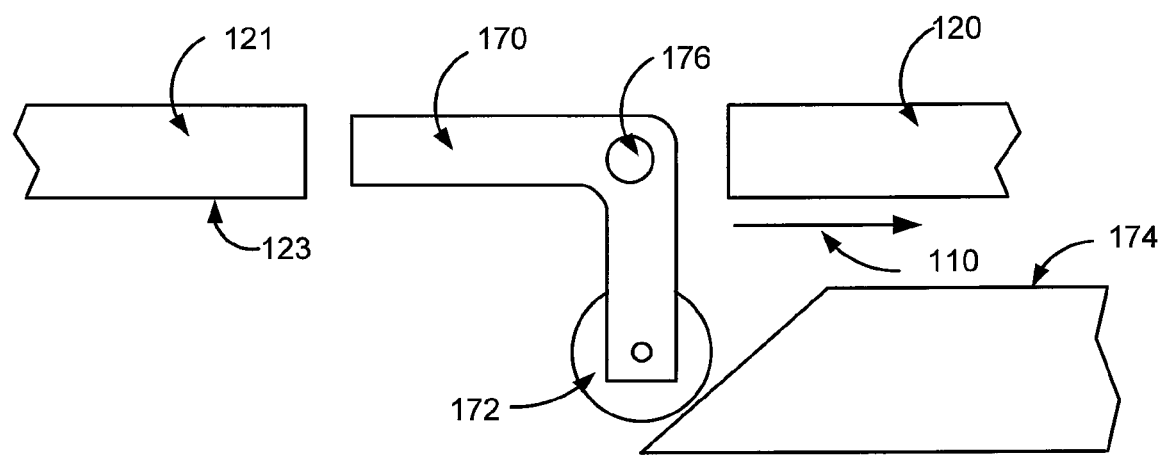
FIG. 11 is a partial side view of an embodiment of a rotationally actuatable flight in the retracted position, as disclosed herein.
Figure 12:
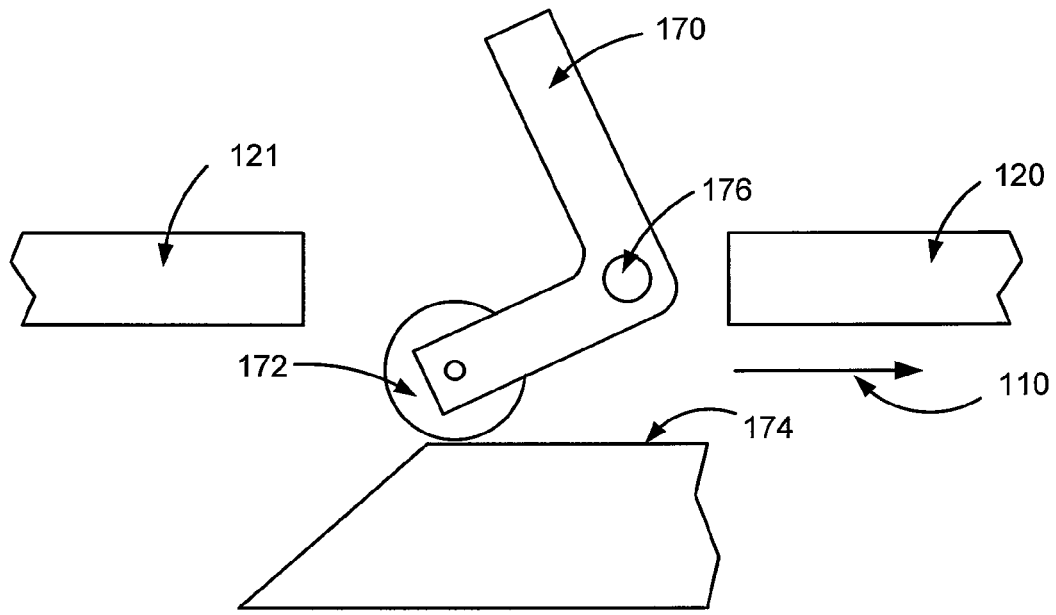
FIG. 12 is a partial side view of an embodiment of a rotationally actuatable flight in the extended position, as disclosed herein.

Reference is now made to FIG. 11, which is a partial side view of an embodiment of a rotationally actuatable flight in the retracted position. The rotationally actuatable flight 170 is pivotally mounted in a cavity of the conveyor belt 120 via a pivot pin or axle 176. The rotationally actuatable flight 170 extends from the pivot pin 176 in two general directions. The rotationally actuatable flight 170 extends in a first direction that is generally parallel to and, when retracted, is recessed below the top surface 121 of the conveyor or the plane defined by the top surfaces of the rollers in the conveyor. The rotationally actuatable flight 170 extends in a second direction below the bottom surface 123 of the conveyor belt 120. In this second direction, the rotationally actuatable flight 170 includes a cam roller 172. As the conveyor belt 120 proceeds in the belt travel direction 110, the cam roller 172 engages a cam surface 174. As illustrated in FIG. 12, which is a partial side view of an embodiment of a rotationally actuatable flight in the extended position, the engagement between the cam roller 172 and the cam surface 174 causes the rotationally actuatable flight 170 to pivot about the pivot pin 176. This pivotal action causes the rotationally actuatable flight 170 to extend above the top surface 121 of the conveyor belt 120.

Figure 13:
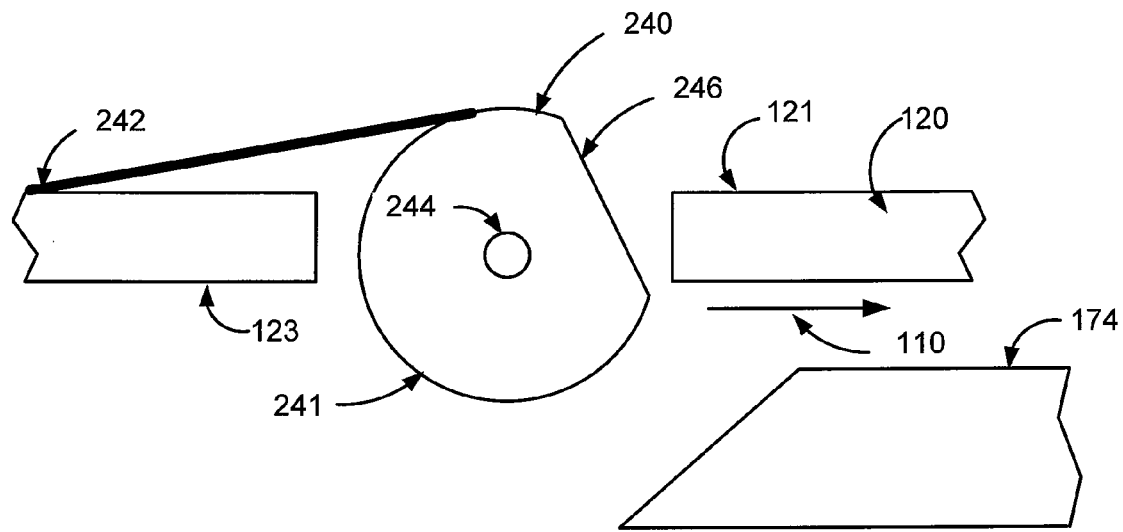
FIG. 13 is a partial side view of an alternative embodiment of a rotationally actuatable flight in the retracted position, as disclosed herein.
Figure 14:
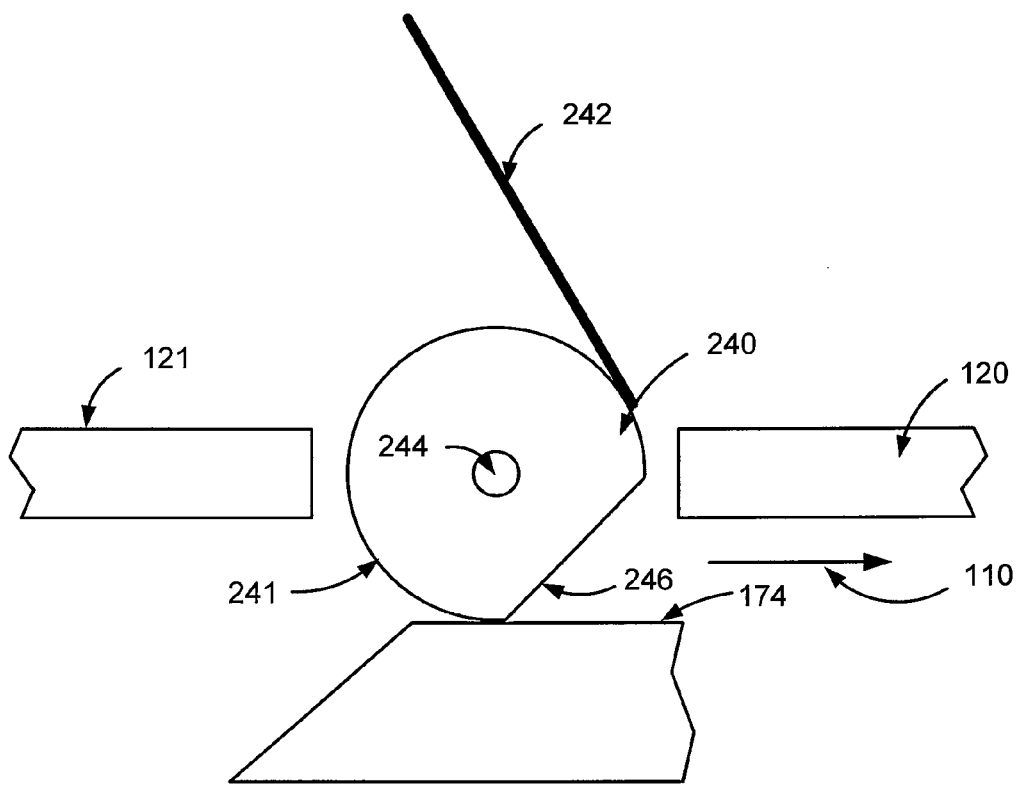
FIG. 14 is a partial side view of an alternative embodiment of a rotationally actuatable flight in the extended position, as disclosed herein.

Reference is now made to FIG. 13, which is a partial side view of an alternative embodiment of a rotationally actuatable flight in the retracted position. The rotationally actuatable flight 240 is pivotally mounted in a cavity of the conveyor belt 120 via a pivot pin or axle 244. The rotationally actuatable flight 240 includes a roller 241 having a flat side 246 and a flight extending member 242. In the retracted position, the flight extending member 242 generally rests on the top surface 121 of the conveyor belt 120 below or at the plane defined by the top surfaces of the rollers in the conveyor. As the conveyor belt 120 proceeds in the belt travel direction 110, the roller 241 engages a cam surface 174. As illustrated in FIG. 14, which is a partial side view of an alternative embodiment of a rotationally actuatable flight in the extended position, the engagement between the roller 241 and the cam surface 174 causes the rotationally actuatable flight 240 to pivot about the pivot pin 244. This pivotal action causes the rotationally actuatable flight extending member 242 to extend above the top surface 121 of the conveyor belt 120. When an object moving along the top of the rollers engages the flight extending member 242, the roller 241 is rotated further to a position where the flat side 246 of the roller 241 is proximate to the cam surface 174. When the flat side 246 is proximate to the cam surface 174, the rotationally actuatable flight does not frictionally engage the cam surface 174 and slipping does not occur.

The linearly and rotationally actuatable flights are merely examples of flights contemplated in this disclosure and are not intended to limit the scope or spirit of the disclosure. For example, an actuatable flight can be configured to be performed by multiple flights operatively engaged with one or more cams, where a cam includes, but is not limited to, a cam roller, an eccentric lobe on a rotary cam surface, and a cam surface, among others.

Figure 15:
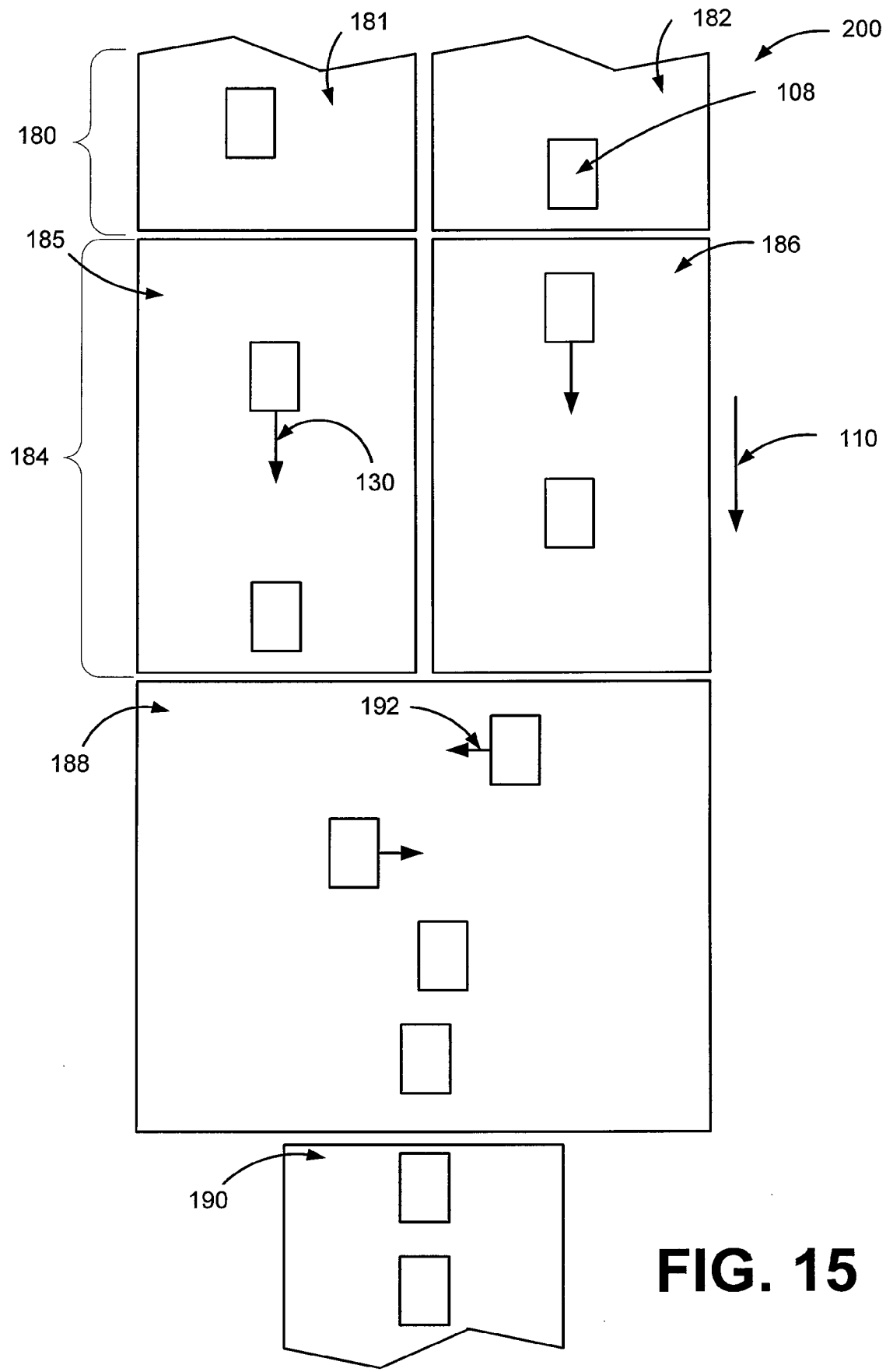
FIG. 15 is block diagram illustrating a partial top view of an embodiment of a conveyor system that utilizes a timing conveyor belt, as disclosed herein.

Reference is now made to FIG. 15, which is a block diagram illustrating a partial top view of an embodiment of a conveyor system that utilizes a timing conveyor belt. The conveyor system 200 includes a feeder section 180, a timing section 184, a singulating section 188, and a subsequent processing section 190. The feeder section 180 includes a first feed conveyor 181 and a second feed conveyor 182. Each of the feed conveyors 181, 182 can transfer objects 108 to the timing section 184 at irregular intervals and in irregular lateral belt positions. The timing section 184 includes a first timing conveyor 185 and a second timing conveyor 186, corresponding to the first and second feed conveyors 181, 182, respectively. Objects 108 that are received by the timing section 184 are accelerated to a relative speed 130 until they reach designated positions on the first and second timing conveyors 185, 186. In this non-limiting example, the designated positions of the first and second timing conveyors 185, 186 are established such that the objects 108 leave the timing section 184 out of phase. In other words, an object leaving the first timing conveyor 185 will arrive at the singulating section 188 between successive objects leaving the second timing conveyor 186.

In other embodiments, the timing section 184 is utilized to deliver objects 108 to a subsequent process conveyor at substantially identical, or in-phase, positions. When the objects 108 are delivered to the singulating section 188, they are directed in a lateral direction 192 towards the center of the singulating section 188. By positioning the objects on the first and second conveyors 185, 186, respectively, in an out-of-phase arrangement, the resulting singulated objects are configured to be in a single line and are evenly spaced for subsequent processing. When the objects 108 are received by the conveyor 190 for subsequent processing, they are arranged in a single column having fixed and even distances between the object. The conveyor system depicted in FIG. 15 is merely exemplary and not intended to limit the scope or spirit of the disclosure in any way. For example, a first and second timing conveyor can be used side-by-side in parallel and in phase such that two objects can be delivered side-by-side for a downstream process. Additionally, multiple timing conveyors can be used in a non-parallel arrangement in, for example, a merging operation to ensure that conveyed objects never contact each other when merging.

Figure 16:
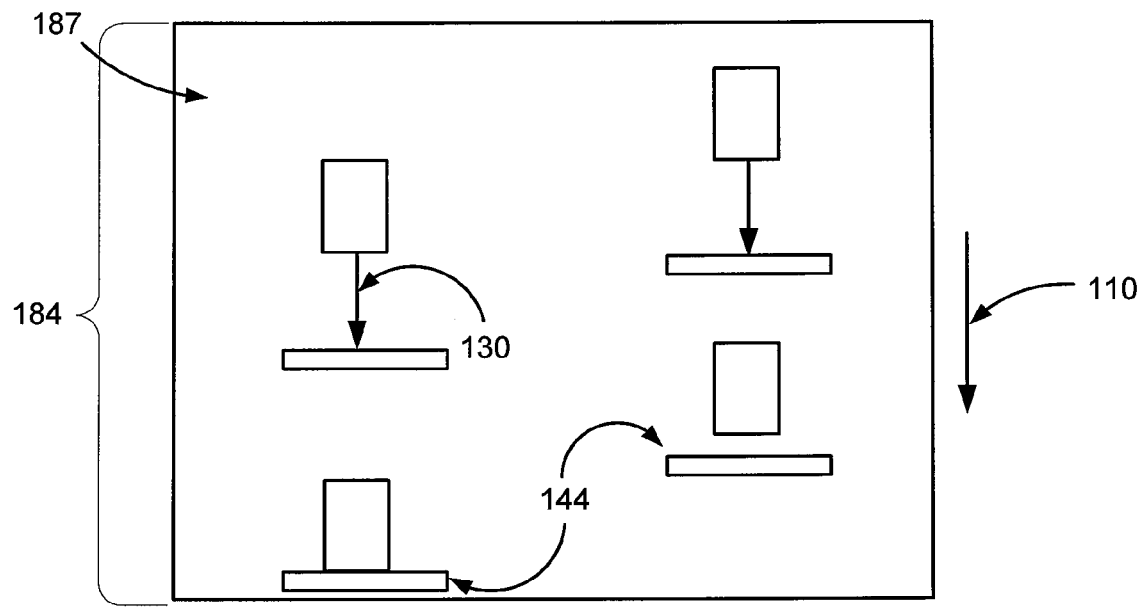
FIG. 16 is a block diagram illustrating a partial top view of an alternative embodiment of a timing section illustrated in FIG. 15.

Reference is made to FIG. 16, which is a block diagram illustrating a partial top view of an alternative embodiment of a timing section 184 as illustrated in FIG. 15. Instead of the timing section 184 including multiple timing conveyors 185, 186 to accomplish a desired phase relationship between multiple conveyor sources, the timing section 184 includes one timing conveyor 187. The timing conveyor 187 includes multiple flights 144 arranged to engage a portion of the belt width and positioned with a relative spacing to create the desired phase relationship between the multiple conveyor sources. For example, as illustrated, the flights 144 are configured to space the conveyed objects on the left side of the conveyor out of phase with the objects on the right side of the conveyor. In the alternative, if simultaneous arrival of the objects is desired, the flights on the left and right sides are arranged adjacent one another. Additionally, frictions pads or other positioning components can be utilized instead of flights.

Figure 17:
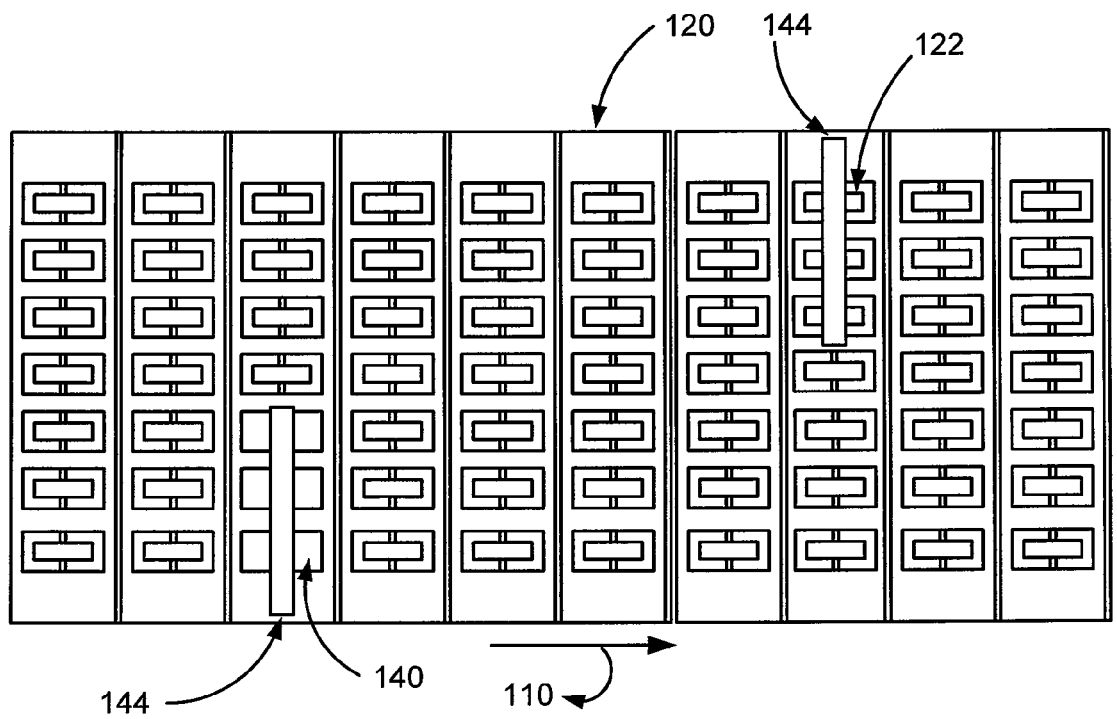
FIG. 17 is a block diagram illustrating a partial top view of an embodiment of a conveyor as utilized in embodiments of FIG. 14.

Reference is now made to FIG. 17, which is a block diagram illustrating a partial top view of an embodiment of a conveyor as utilized in embodiments of FIG. 16. The conveyor belt 120 includes multiple flights 144 each configured to span only a portion of the width of the conveyor belt 120. In this manner, objects delivered to different portions of the conveyor belt 120 can be arranged to be delivered in an out-of-phase configuration to a subsequent conveyor system component (not shown here). The conveyor belt 120 can be configured to receive the flights 144, or other positioning components, over or in the multiple cavities 140. Alternatively, the flights 144, or other positioning components, can be attached to the conveyor belt 120 without removing rollers 122 from the cavities 140. The ability to easily configure the arrangement of the positioning components greatly increases the flexibility and the utility of the timing conveyor.

Figure 18:
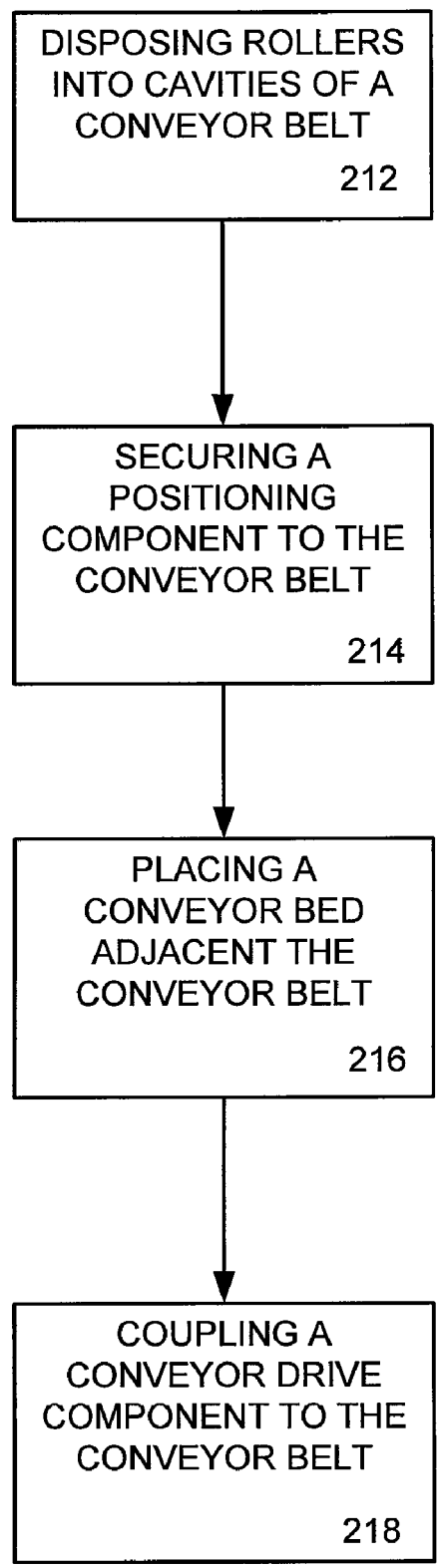
FIG. 18 is a block diagram illustrating an embodiment of a method of manufacturing a conveyor.

Reference is now made to FIG. 18, which is a block diagram illustrating an embodiment of a method of manufacturing a conveyor, as disclosed herein. In block 212, a roller is disposed into a cavity of a chain segment. A positioning component is secured to the conveyor belt in block 214. In block 216, a roller-engagement surface in is placed adjacent to the conveyor belt and, in block 218, a conveyor drive component is coupled to the conveyor belt.

The conveyor can optionally include rollers of a variety of sizes and having a variety of frictional properties. The different roller configurations can be arranged to create zones functioning at different levels of engagement with a conveyed object. For example, larger rollers having a higher friction coefficient can be used in a high-engagement zone to improve acceleration performance. Similarly, smaller rollers having a lower friction coefficient can be used in a low-engagement zone where slipping between the conveyed object and the rollers is a desirable property.

The conveyor system may also employ a variety of different positioning components. For example, one or more friction pads can be used to provide a relatively smooth deceleration. Alternatively, fixed or actuatable flights can be used to provide a more accurate stopping position. Additionally, the number of positioning components and the spacing therein can be configured, in conjunction with the conveyor speed, to determine the final interval or distance between conveyed objects. Further, the conveyor can be driven by a variety of different drive types utilizing a variety of different drive coupling methods, as discussed above.

Figure 19:
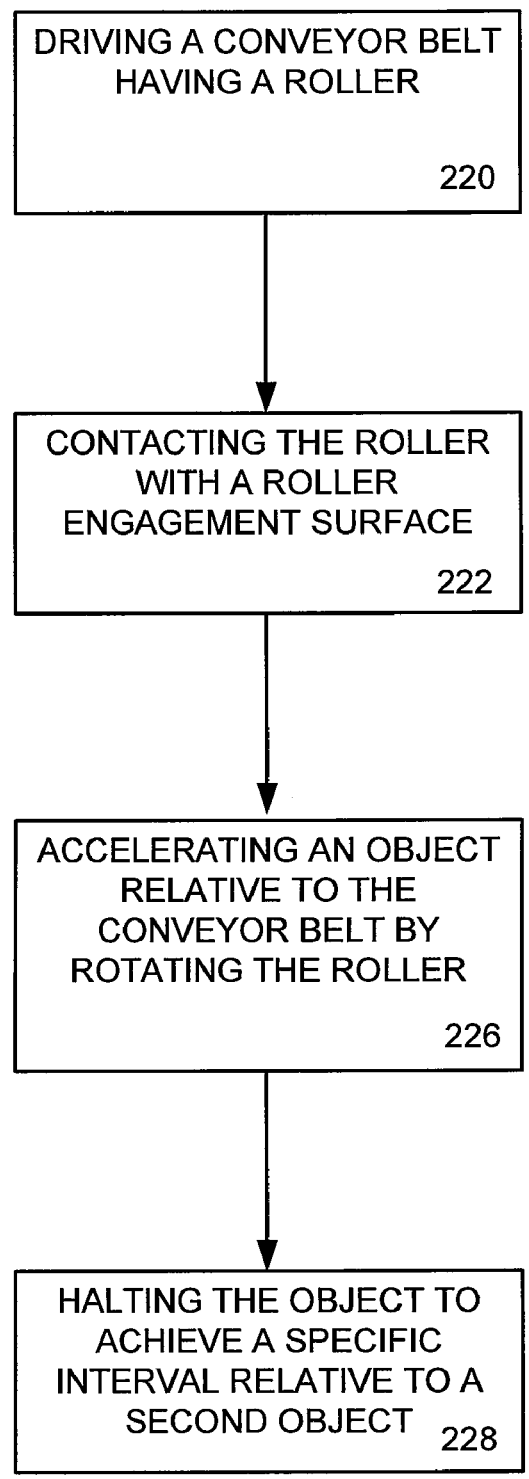
FIG. 19 is a block diagram illustrating an embodiment of a method for conveying objects.
Figure 20:
FIG. 20 is a block diagram illustrating an embodiment of a method for positioning objects.

Reference is now made to FIG. 19, which is a block diagram illustrating an embodiment of a method for equally spacing objects. In block 220 a conveyor belt having a roller is driven and a roller-engagement surface is contacted with the roller in block 222. As the conveyor belt travels along the roller-engagement surface, the roller is rotated. In block 226 an object is accelerated relative to the conveyor belt from contact with the rotating roller. The object is halted on the conveyor belt to achieve a specific interval relative to a second object in block 228. Similarly, referring to FIG. 20, some embodiments of the disclosure herein can be viewed as a method for positioning objects. The method is initiated when an object is accelerated along a conveyor belt in block 230. In accordance with a desired position, the object is halted with a positioning component in block 232. Moving the object relative to the conveyor permits the definition of desired spacing without reducing the conveyor speed, thereby increasing the throughput and thus the efficiency of the conveyor operation.

Figure 21:
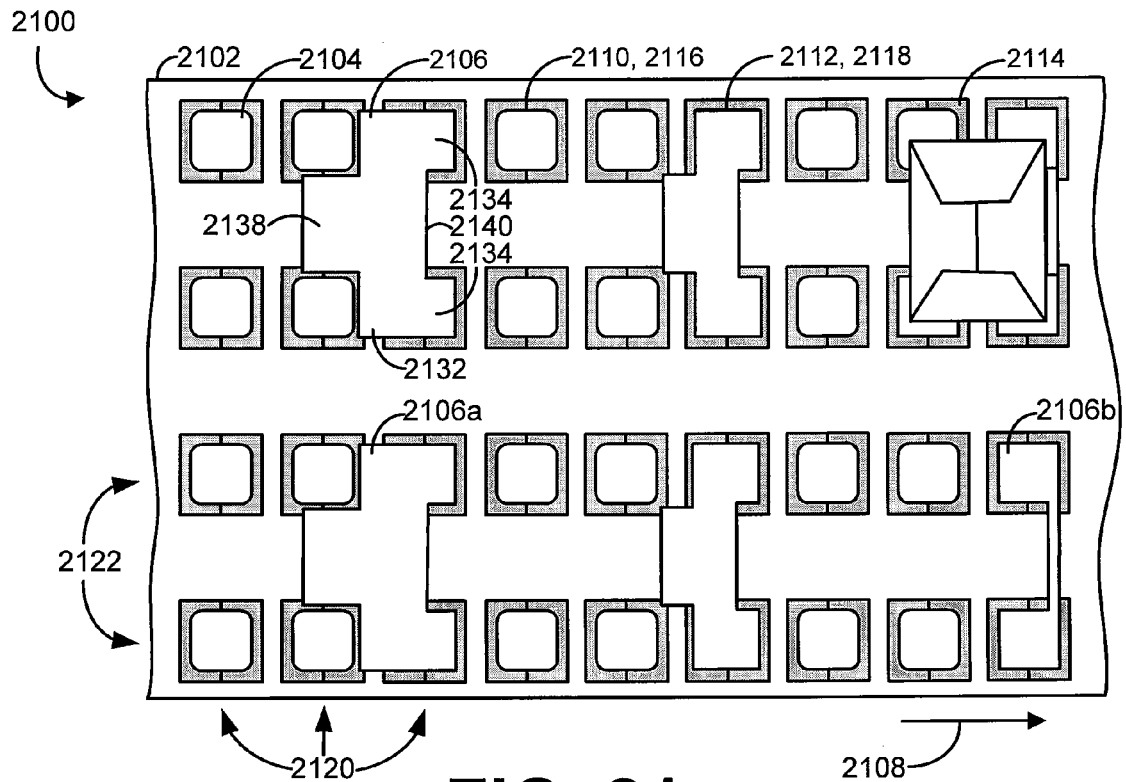
FIG. 21 is a diagram illustrating a partial top view of another embodiment of a conveyor, the conveyor having a plurality of rotationally actuatable flights.
Figure 22:
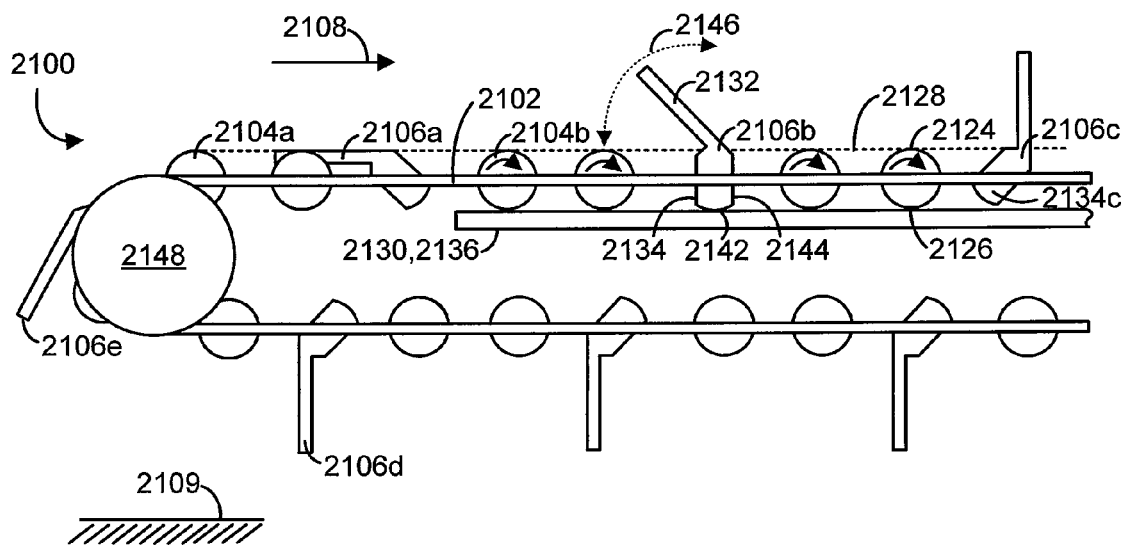
FIG. 22 is a partial side view of the conveyor shown in FIG. 21.

FIG. 21 is a diagram illustrating a partial top view of another embodiment of a conveyor 2100. The conveyor 2100 includes a conveyor belt 2102, a plurality of rollers 2104, and one or more rotationally actuatable flights 2106. As shown in FIG. 22, which is a partial side view of the conveyor shown in 2100, the conveyor belt 2102 is substantially parallel to the ground 2109 and is configured to travel in a direction of belt travel 2108 at a speed of the conveyor belt with respect to the ground, although other configurations are possible.

With reference to FIG. 21, the rollers 2104 and the flights 2106 are coupled to the conveyor belt 2102. Each roller 2104 has an axis of rotation 2110 about which the roller is configured to rotate. In the illustrated embodiment, the axis 2110 about which the roller 2104 rotates is a shaft 2116 used to suspend the roller within an opening 2114 in the conveyor belt 2102. Likewise the flight 2106 has an axis of rotation 2112 about which the flight is configured to rotate, and in the illustrated embodiment the axis 2112 is a shaft 2118 used to suspend the flight within one or more openings 2114. The conveyor belt 2102 includes a plurality of these openings 2114 formed through the conveyor belt, and the openings are spaced apart from each other. The openings 2114 can be arranged in any pattern, such as a series of rows 2120 and columns 2122. In the illustrated embodiment, each opening 2114 is occupied by the roller 2104 or flight 2106, although it is not necessary for each opening to be occupied. The axles 2116, 2118 may be substantially perpendicular to the direction of belt travel 2108 such that the rollers 2104 and flights 2106 rotate in the direction of belt travel, although other configurations are possible.

With reference to FIG. 22, each roller 2104 has a diameter that exceeds a thickness of the conveyor belt 2102, such that an upper surface 2124 of the roller is positioned above the conveyor belt and a lower surface 2126 of the roller is positioned below the conveyor belt. A plane 2128 is formed above the conveyor belt 2102 by the upper surfaces 2124 of substantially all of the rollers 2104, and the plane is substantially parallel to the conveyor belt. In the illustrated embodiment, the upper surfaces 2124 of substantially all of the rollers 2104 are co-planar with the plane 2128. In other embodiments, the upper surfaces 2124 of the rollers 2104 may not form the plane 2128 or a single roller may not have its upper surface in the plane if, for example, the roller is oddly shaped or has a slightly larger or smaller diameter than the other rollers.

A roller-engagement surface 2130 is positioned below the conveyor belt 2102 adjacent the lower surfaces 2126 of at least some of the rollers. As the conveyor belt 2102 moves in the direction of belt travel 2108, the lower surfaces 2126 of the rollers 2104 come into contact with the roller-engagement surface 2130. The rollers 2104 that are engaging the roller-engagement surface 2130 rotate, while the rollers that are not engaging the roller-engagement surface do not rotate. For example, in the illustrated embodiment, the roller 2104b rotates in the direction of belt travel 2108, while the roller 2104a does not rotate. Regardless of whether the roller 2104 is rotating, however, the roller translates with the conveyor belt 2102 at the speed of the conveyor belt with respect to the ground 2109. For example, the roller 2104a translates in the direction of belt travel 2108 with the conveyor belt 2102 even though the roller 2104a does not rotate.

Each flight 2106 has a projection 2132 above the conveyor belt 2102 that is coupled to at least one cam 2134 below the conveyor belt. The cam 2134 is configured to engage a cam surface 2136 positioned below the conveyor belt 2102 to impart a force R on the flight 2106 (see FIG. 24). The projection 2132 is configured to respond to the force R by rotating from a retracted position to an extended position. In the retracted position, the projection 2132 does not extend above the plane 2128 formed by the upper surfaces 2124 of the rollers 2104, but in the extended position the projection does extend above the plane. Once the flight is in the extended position, the cam 2134 is configured to clear or pull away from the cam surface 2136, so that the cam no longer contacts the cam surface and does not skid with respect to the cam surface.

In the illustrated embodiment, the flight 2106a is shown in the retracted position and the projection of the flight 2106a is shown co-planar with the plane 2128, although other configurations are possible. The flight 2106b is shown rotating along a rotational path 2146 between the retracted and extended positions, as a result of the cam 2134 contacting the cam surface 2136. The flight 2106c is shown in the extended position, with the projection extending above the plane 2128 and the cam 2134c clearing the cam surface 2136.

As shown, the cam 2134 is a cam roller 2142 having a curved lower surface and a relief 2144 along a backside of the curved lower surface. As the conveyor belt 2102 moves in the direction of belt travel 2108, the cam roller 2142 comes into contact with the cam surface 2136. The curved lower surface of the cam roller 2142 rolls along the cam surface 2136 to rotate the projection 2132 into the extended position. Once the projection 2132 is in the extended position, the relief 2144 of the cam roller 2142 is adjacent the cam surface 2136 so that the cam roller does not skid against the cam surface. As shown, the cam surface 2136 is the same as the roller-engagement surface 2130, although in other embodiments the two surfaces may differ from each other.

In some embodiments, the conveyor belt 2102 may be configured to travel in a loop. For example, in FIG. 22 the conveyor 2100 includes a rotary drum 2148, and the conveyor belt 2102 loops around the rotary drum 2148. At points during the loop, the flight 2106 is positioned under the conveyor belt 2102 with the projection 2132 of the flight hanging downward, and the flight is pulled into the retracted position under the force of gravity as the conveyor belt travels around the rotary drum 2148. For example, the flight 2106*d* is hanging downward, and the projection of flight 2106*e* is being pulled into the retracted position under the force of gravity. Once the conveyor belt 2102 travels around the rotary drum 2148, the flight 2106*a* is positioned with the projection 2132 in the retracted position.

Figure 23:
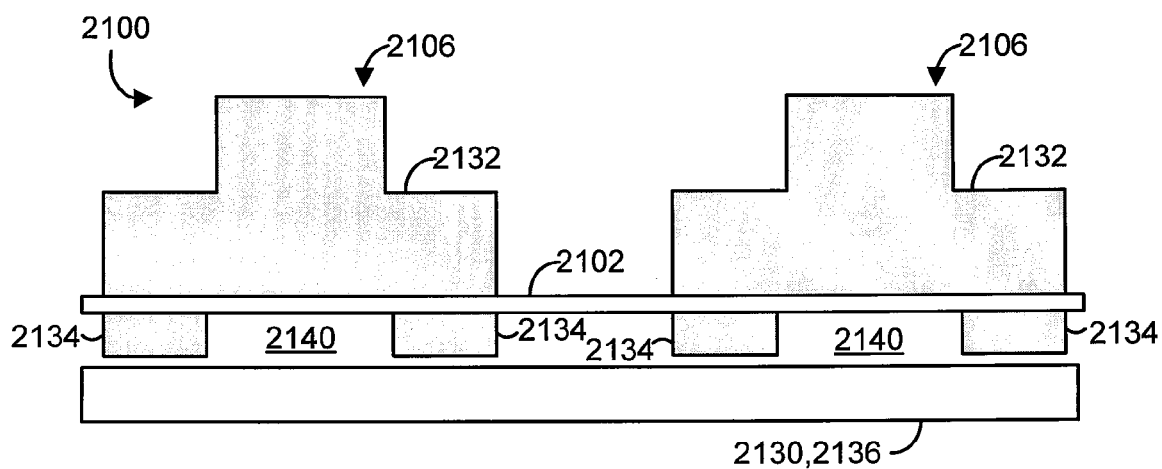
FIG. 23 is a front view of the conveyor shown in FIG. 21, illustrating the rotationally actuatable flights in an extended position.

With reference back to FIG. 21, the flights 2106 are suspended in some of the openings 2114. As shown, the flight 2106 includes two cams 2134 that are suspended in adjacent openings 2114 and are coupled together above the conveyor belt 2102 by the projection 2132, although in other embodiments the flight may have one cam or more than two cams. The projection 2132 is sized and shaped to fit between the rollers 2104 in the next adjacent row 2120 without overlapping the rollers, although the projection may slightly overlap the openings 2114 in which the rollers are disposed. To increase the height that the projection 2132 extends above the conveyor belt 2102 when in the extended position, the projection may have an extension tab portion 2138 that extends between the rollers 2104 in the next adjacent row 2120. The projection 2132 may also have a relief opening 2140 between the openings 2114 occupied by the cams 2134. The relief opening 2140 enables the flight 2106 to rotate into the extended position without the projection 2132 and the conveyor belt 2102 interfering with each other, as shown in FIG. 23, which is a front view of the conveyor 2100 illustrating the flight in the extended position. Although a specific embodiment of a rotationally actuatable flight 2106 is described above, a variety of embodiments could be imagined in view of the above disclosure, and all of the embodiments are intended to be included within the scope of the present disclosure.

The operation of the conveyor 2100 will now be described with reference to FIGS. 24-27, each of which is a partial side view of the conveyor 2100 illustrating an object 2150 positioned on the conveyor belt 2102 in various positions. The conveyor belt 2102 is configured to move in the direction of belt travel 2108. The rollers 2104 are configured to move the object 2150 along the conveyor belt 2102 over the plane 2128 defined by the upper surfaces 2124 of the rollers. The flights 2106 are configured to obstruct the object 2150 from moving over the plane 2128 so that the object exits the conveyor belt 2102 having a pre-determined spacing with respect to other objects on the conveyor belt. Because the flights 2106 are movable between the retracted and extended positions, the object 2150 may become positioned over the flight. In such case, the conveyor 2100 is configured so that the flight 2106 remains in the retracted position, allowing the object 2150 to continue moving along the conveyor belt 2102 without being disturbed by the rotating flight.

Specifically, the conveyor belt 2102 is configured to move in the direction of belt travel 2108 at the speed of the conveyor belt with respect to the ground 2109. The object 2150 on the conveyor belt 2102 is supported by the rollers 2104. Initially, the rollers 2104 are not rotating because the conveyor belt 2102 is not adjacent the roller-engagement surface 2130. For example, in FIG. 24 the roller 2104*a* is not rotating. Therefore, the object 2150 is stationary with respect to the rollers 2104, and the object, rollers, and conveyor belt 2102 translate in unison at the speed of the conveyor belt with respect to the ground 2109 in the direction of belt travel 2108.

Figure 24:
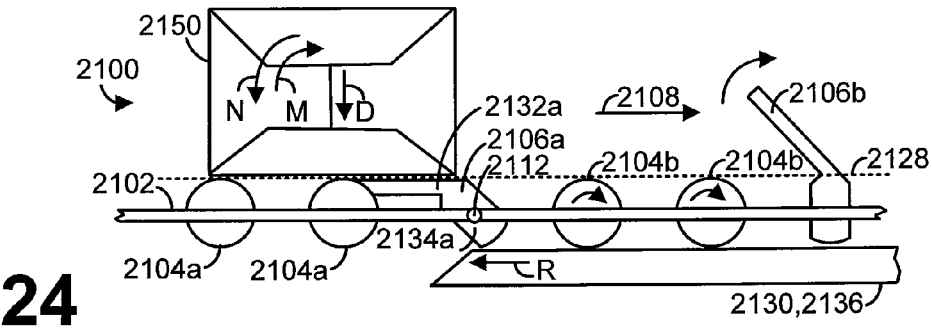
FIG. 24 is a partial side view of the conveyor shown in FIG. 21, illustrating an object positioned over the rotationally actuatable flight.

In FIG. 24 the object 2150 is positioned over the flight 2106*a*. It is possible for the object 2150 to be positioned over the flight 2106 because the projection 2132*a* of the flight is in the retracted position, and therefore the projection does not extend above the plane 2128. As the conveyor belt 2102 moves, the flight 2106*a* becomes positioned adjacent the cam surface 2136 so that the flight can be rotated into the extended position. The cam 2134*a* contacts the cam surface 2136, and a force R is imparted on the flight 2106*a* to rotate the flight into the extended position, but because the object 2150 exerts a downward force D on the flight, the flight remains in the retracted position.

More specifically, the force R is created through friction between the cam 2134*a* and the cam surface 2136 at a point of engagement 2135, although in other embodiments the force R can be created in other manners. Because the point of engagement 2135 is spaced apart from the axis of rotation 2112 of the flight 2106*a*, a moment M is exerted on the flight 2106*a* that tends to rotate the flight into the extended position. At the same time, the object 2150 exerts a downward force D on the flight 2106*a*, exerting a moment N on the flight that tends to prevent the flight from rotating into the extended position. The moment M does not exceed the moment N so that the flight 2106*a* remains in the retracted position despite engagement between the cam 2134*a* and the cam surface 2136. Note that the conveyor 2100 can convey objects 2150 having a range of shapes, weights, and configurations, the therefore the flight 2106 may have a range of shapes, weights materials, and configurations to ensure the moment M does not exceed the moment N.

Figure 25:
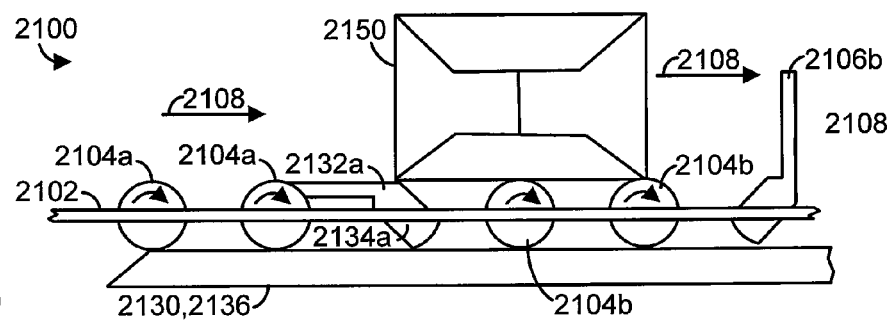
FIG. 25 is a partial side view of the conveyor shown in FIG. 21, illustrating the rotating rollers moving the object off the rotationally actuatable flight.
Figure 26:
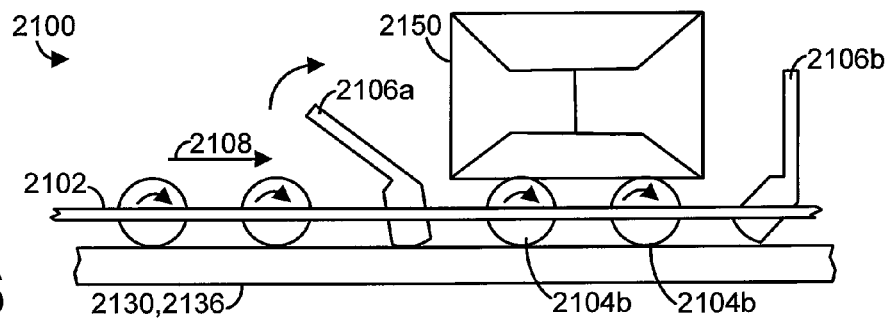
FIG. 26 is a partial side view of the conveyor shown in FIG. 21, illustrating the rotationally actuatable flight rotating from the retracted position to the extended position after the object has moved off the flight.
Figure 27:
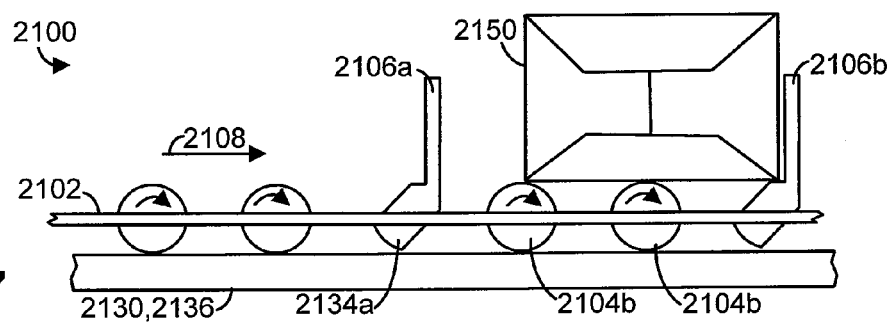
FIG. 27 is a partial side view of the conveyor shown in FIG. 21, illustrating the rotationally actuatable flight in the extended position, and illustrating the object being halted by the next adjacent flight.

In FIG. 25, the cam 2134*a* temporarily skids along the cam surface 2136 as the conveyor belt 2102 continues moving in the direction of belt travel 2108. The flight 2106*a* remains in the retracted position even though the cam 2134*a* is contacting the cam surface 2136, so that the object 2150 on the conveyor belt 2102 is not disturbed. The rollers 2014*a* supporting the object 2150 are brought into contact with the roller-engagement surface 2130 and begin rotating. The rotation of the rollers 2104*a* moves the object 2150 along the plane 2128 formed by the upper surfaces of the rollers in the direction of belt travel 2108. The object 2150 is moved off the flight 2106*a* so that the cam 2134*a* no longer skids on the cam surface 2136, but instead rolls along the cam surface to impart the force R on the flight 2106*a*, as shown in FIG. 26. The flight 2106*a* responds to the force R by rotating from the retracted to the extended position. Once the flight 2106*a* is in the extended position, the cam 2134*a* is pulled out of contact with the cam surface 2136 so that the cam does not wear against the cam surface, as shown in FIG. 27. Therefore, the conveyor 2100 is configured so that the flight 2106 does not obstruct the movement of the object 2150 when in the retracted position, but does obstruct the movement of the object when in the extended position. In some embodiments, an upper surface of the projection 2132 is a material having a relatively low coefficient of friction so that the object can be moved over the flight 2106 with relative ease.

As mentioned, the object 2150 achieves a speed with respect to the conveyor belt 2102 due to the rotation of the rollers 2104. The movement of the object 2150 is shown by its change of relative position on the conveyor belt 2102 in FIGS. 24-27. Because the object 2150 is moving with respect to the conveyor belt 2102, the object is halted by the next adjacent flight 2106*b* to control the position of the object on the conveyor belt. In FIG. 24, the flight 2106*b* is rotating into the extended position so that its projection 2132*b* extends above the plane 2128 to obstruct the movement of the object. In FIGS. 25-26, the rotating rollers 2104 move the object with respect to the conveyor belt until the object is positioned adjacent the flight 2106b. In FIG. 27, the flight 2106b halts the object 2150 so that the position of the object is controlled.

When the object 2150 is moving with respect to the conveyor belt 2102 along the rotating rollers 2104, the object travels at an increased speed with respect to the ground 2109. In embodiments in which there is no slip, the speed of the object 2150 with respect to the conveyor belt 2102 is substantially the same as the speed of the conveyor belt with respect to the ground 2109. In such a case, the increased speed at which the object 2150 travels with respect to the ground 2109 is substantially twice the speed of the conveyor belt 2102 with respect to the ground. In embodiments in which slip exists, the rotation of the rollers 2104 causes the object 2150 to achieve a speed with respect to the conveyor belt 2102 that is less than the speed of the conveyor belt with respect to the ground 2109. In such case, the increased speed at which the object 2150 travels with respect to the ground 2109 is greater than the speed of the conveyor belt 2102 with respect to the ground but is less than twice the speed of the conveyor belt with respect to the ground. In some embodiments a material having a relatively high coefficient of friction can be used for the exterior surface of the rollers 2104 and/or the roller-engagement surface 2130 so that slip is impeded between the rollers and the object 2150 and/or the rollers and the roller-engagement surface.

Note that once the rollers 2104 are rotating, the object 2150 moves at the increased speed until either the rollers stop rotating or the object is halted by a flight 2106 in the extended position. In FIG. 24 the object 2150 is supported by rollers 2104a that are not rotating, and therefore the object translates with the conveyor belt 2102 at the speed of the conveyor belt with respect to the ground 2109. In FIGS. 25-26, the object 2150 is supported by rotating rollers 2104, and therefore the object travels at the increased speed with respect to the ground 2109. In FIG. 27, the flight 2106b obstructs the movement of the object 2150, and therefore the object discontinues moving at the increased speed and is limiting to moving with the conveyor belt 2102 at the speed of the conveyor belt with respect to the ground 2109. In this manner, spacing of the object 2150 is achieved.

Figure 28:
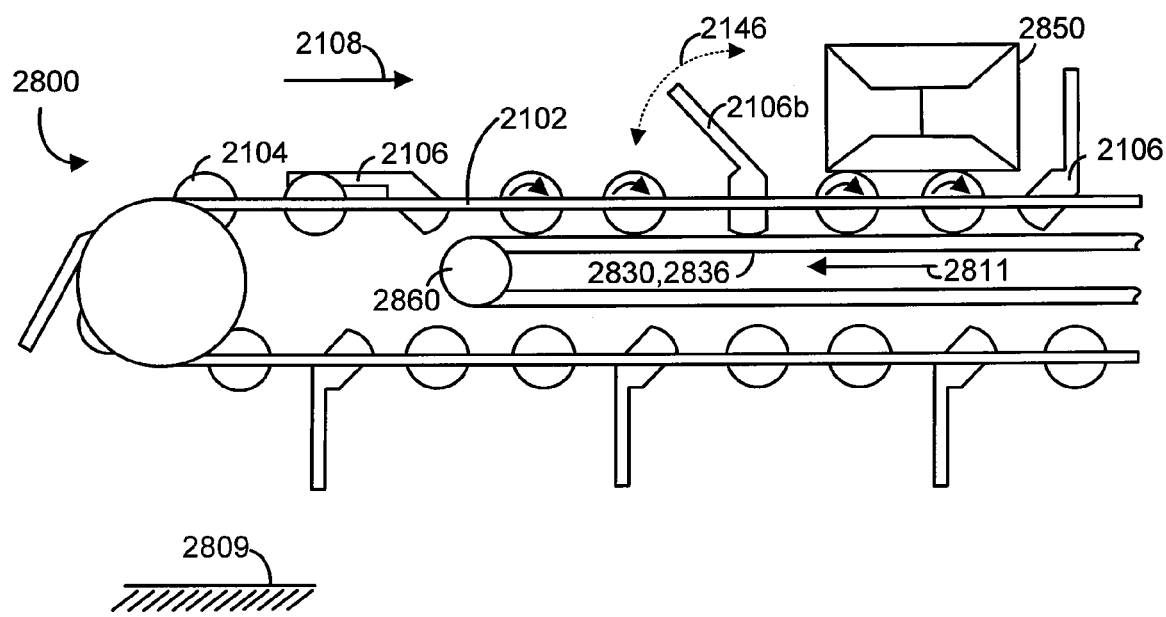
FIG. 28 is a partial side view of an embodiment of a conveyor having a roller-engagement surface that moves in a direction opposite from the direction of belt travel.

FIG. 28 is a partial side view of an embodiment of a conveyor 2800 having a roller-engagement surface 2830 that is configured to move in a direction 2811 opposite from the direction of belt travel 2108. The movement of the roller-engagement surface 2830 increases the rotational velocity of the rollers 2104. As a result, an object 2850 moving along the rotating rollers 2104 moves at a speed that is relatively greater than the speed would be if the roller-engagement surface 2830 was not moving. In cases in which the roller-engagement surface 2830 moves at a speed with respect to the ground that is greater than zero, the speed of the object 2850 with respect to the conveyor belt 2102 is greater than the speed of the conveyor belt 2102 with respect to the ground 2109. In such a case, the speed of the object 2850 with respect to the ground 2809 is more than twice the speed of the conveyor belt 2102 with respect to the ground.

Increasing the speed at which the object 2850 is conveyed with respect to the ground 2109 may be desirable in cases in which a conveyor 2800 having a relatively smaller footprint is required. Because the object 2850 is conveyed at a relatively faster speed, a relatively shorter conveyor belt 2102 can be used. Thus, the conveyor 2800 can have a smaller footprint.

In some embodiments, the cam surface 2836 moves in the direction 2811 opposite from the direction of belt travel 2108, such as in embodiments in which the cam surface and the roller-engagement surface 2830 are the same surface. In such cases, the flight 2106 rotates along the rotational path 2146 relatively faster than if the cam surface 2836 was not moving.

Figure 29:
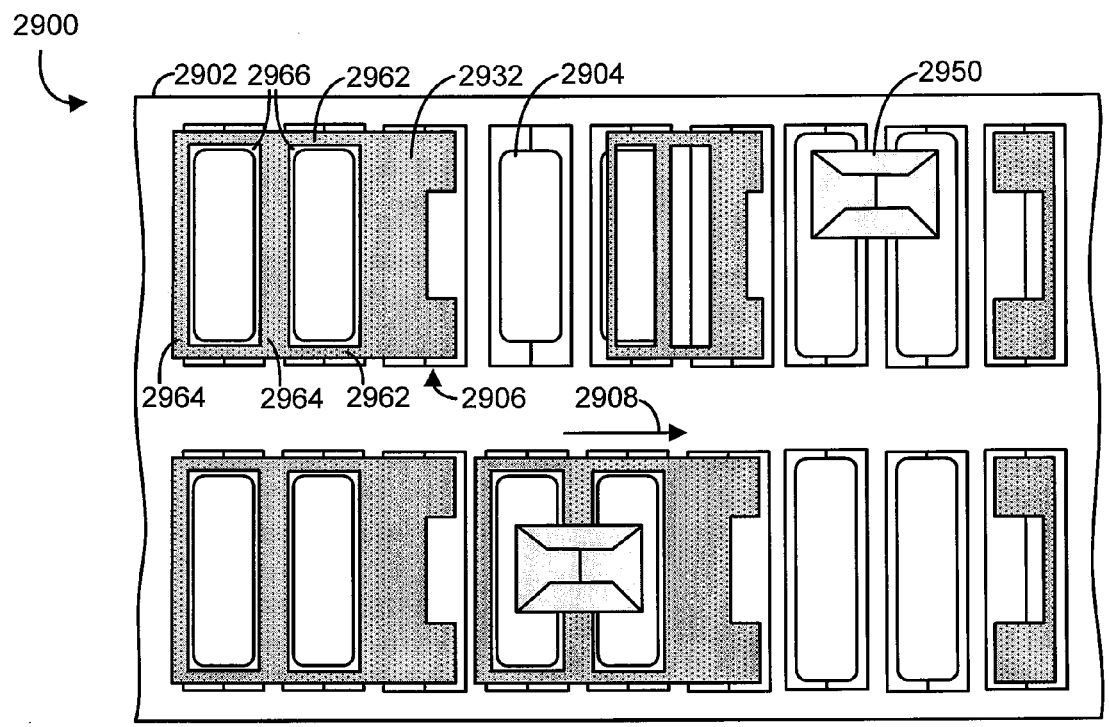
FIG. 29 is a diagram illustrating a partial top view of another embodiment of a conveyor, the conveyor having a plurality of another embodiment of rotationally actuatable flights.

FIG. 29 is a diagram illustrating a partial top view of another embodiment of a conveyor 2900. The configuration of the conveyor 2900 is suited to convey relatively smaller objects 2950. Specifically, the object 2950 has a relatively smaller footprint, meaning a relatively smaller surface area on a plane parallel to the conveyor belt 2902. Therefore, the rollers 2904 are relatively larger and/or relatively closer together so that the surface area of the rollers is increased. For example, the illustrated rollers 2904 are transverse cylindrical rollers. The increased surface area ensures proper contact between that the object 2950 and the rollers 2904, so that the rollers support the object and the tendency of the object to fall from the roller onto the conveyor belt is thereby reduced.

The flight 2906 is configured to fit around or mate with one or more adjacent rollers 2904. The projection 2932 of the flight 2906 includes a series of interleaving members 2960 such as extension bars 2962 and cross bars 2964. The extension bars 2962 span alongside the rollers 2904 in the direction of belt travel 2908, while the cross bars 2964 span between the extension bars 2962 to couple the extension bars together. Openings 2966 are defined between the extension bars 2962 and the cross bars 2964, and the rollers 2904 fit within the openings. Such a configuration may be advantageous because the rollers 2904 in this embodiment are relatively larger and/or relatively closer together, and therefore there is less space on the conveyor belt 2902 for the projection 2932 when in the retracted position.

Figure 30:
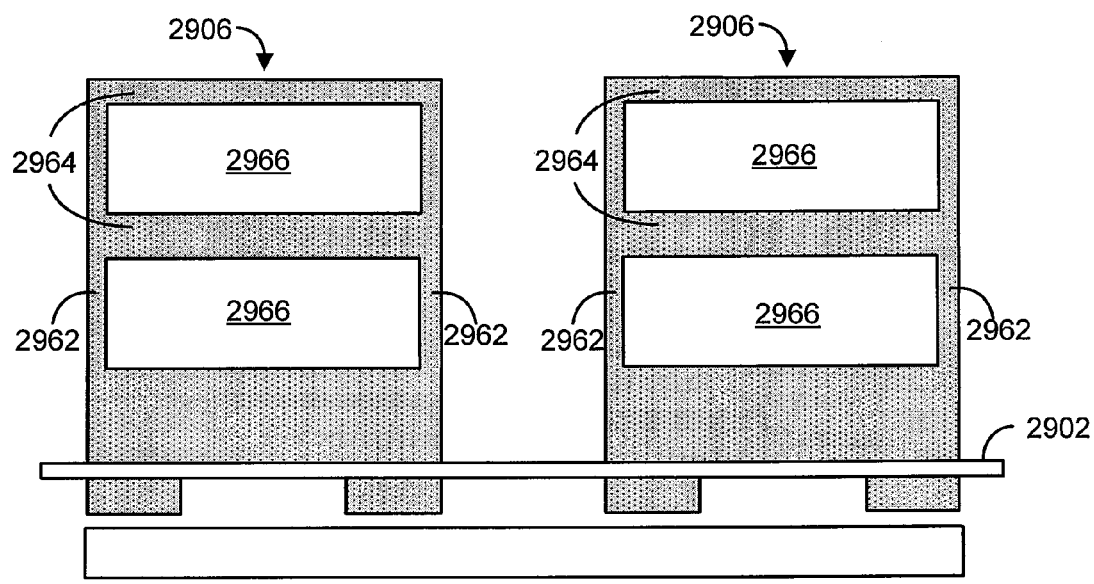
FIG. 30 is a front view of the conveyor shown in FIG. 29, illustrating the rotationally actuatable flights in an extended position

FIG. 30 is a front view of the conveyor 2900 shown in FIG. 29, illustrating the flight 2906 in an extended position. As shown, the flight 2906 is configured to extend above the conveyor belt 2902 such that flight can obstruct the movement of the object 2950 traveling along the conveyor belt. Because of the flight 2906 extends relatively higher above the conveyor belt 2902, the flight may also be configured for use with relatively taller objects 2950.

It should be emphasized that the above-described embodiments of the present disclosure, particularly, any illustrated embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

The invention claimed is:

1. A conveyor comprising:
   a conveyor belt having a top surface and a bottom surface;
   a plurality of rollers coupled to the conveyor belt, the rollers extending above the top surface and below the bottom surface of the conveyor belt so as to be configured to engage a roller-engagement surface below the conveyor belt and form an object support plane above the conveyor belt, engagement between the rollers and the roller-engagement surface causing the rollers to rotate and move an object supported by the rollers along the conveyor belt; and
   a flight coupled to the conveyor belt, the flight including a projection and a cam, the cam being configured to engage a cam-engagement surface below the conveyor belt to impart a moment on the flight that causes the projection to pivot from a retracted position in which the projection is substantially parallel to the object support plane to an extended position in which the projection is substantially perpendicular to the object support plane and halts movement of objects along the conveyor belt.

2. The conveyor of claim 1, wherein the flight does not pivot from the retracted position to the extended position when an object is positioned over the flight.

3. The conveyor of claim 1, wherein the conveyor belt is configured to move objects in a first direction and the roller-engagement surface is configured to move in a second direction that is opposite from the first direction.

4. The conveyor of claim 1, wherein the cam is configured to engage the cam-engagement surface when the flight is in the retracted position, and to not contact the cam-engagement surface when the flight is in the extended position.

5. The conveyor of claim 1, wherein the cam has a relief along a backside that prevents the cam from skidding along the cam-engagement surface once the flight is in the extended position.

6. The conveyor of claim 1, wherein the cam-engagement surface is the same surface as the roller-engagement surface.

7. The conveyor of claim 1, wherein the projection does not extend above the object support plane when the flight is in the retracted position.

8. The conveyor of claim 1, wherein the projection is substantially co-planar with the object support plane when the projection is in the retracted position.

9. The conveyor of claim 1, wherein the conveyor belt includes a plurality of openings in which the rollers and the flights are suspended.

10. The conveyor of claim 9, wherein:
the openings are arranged in rows and columns, each opening being spaced apart from the openings of adjacent rows and columns; and
the flight includes at least two cams, the cams being disposed in adjacent openings and being coupled to each other above the conveyor belt by the projection.

11. The conveyor of claim 9, wherein:
the openings are arranged in rows and columns, each opening being spaced apart from the openings of adjacent rows and columns;
the flight includes at least two cams, the cams being disposed in adjacent openings and being coupled to each other above the conveyor belt by the projection; and
the projection includes a series of interleaving members that fit around adjacent rollers.

12. A conveyor comprising:
a conveyor belt;
a plurality of rollers mounted within the conveyor belt configured to rotate to cause an object on the conveyor belt to travel along the conveyor belt;
a flight mounted to the conveyor belt, the flight having a projection including an object engagement surface, the projection being movable from a retracted position to an extended position in which the object engagement surface extends above and is substantially perpendicular to the conveyor belt so as to form a wall that the object can abut to halt travel of the object along the conveyor belt; and
a roller-engagement surface, wherein the rollers are configured to rotate as a result of engaging the roller-engagement surface.

13. The conveyor of claim 12, wherein the flight does not move from the retracted position to the extended position when an object is positioned over the flight.

14. The conveyor of claim 12, wherein the roller-engagement surface is configured to move in an opposite direction from a direction of belt travel.

15. The conveyor of claim 12, wherein the conveyor belt moves at first speed relative to the ground and the rollers cause the object to move at least substantially twice the first speed relative to the ground.

16. The conveyor of claim 12, wherein:
the projection does not obstruct the movement of the object when in the retracted position, such that the rotating rollers move the object over the projection while the projection is in the retracted position; and
the projection obstructs the movement of the object when in the extended position, such that the conveyor belt moves the object at the first speed relative to the ground when the object abuts the projection.

17. The conveyor of claim 12, further comprising a cam surface, wherein the projection begins and remains in the retracted position until the conveyor belt is positioned adjacent the cam surface and the cam engages the cam surface to rock the flight from the retracted position to the extended position.

18. The conveyor of claim 17, wherein when an object is positioned over the projection and the flight engages the cam surface, the flight temporarily skids on the cam surface so that the flight remains in the retracted position as the rollers continue rotating and move the object off of the projection so that the flight can move into the extended position.

19. The conveyor of claim 12, wherein:
an upper surface of the projection is a material having a relatively low-coefficient of friction, such that when the projection is in the retracted position, the rotating rollers move the object over the projection with relative ease; and
exterior surfaces of the rollers are made of a material having a relatively high coefficient of friction, such that the rotating rollers slip relatively little with respect to the object being moved by the rollers or the roller-engagement surface being engaged to rotate the rollers.

20. A conveyor comprising:
a conveyor belt configured to move objects in a forward direction;
a plurality of rollers coupled to the conveyor and configured to rotate such that objects placed on the conveyor belt in contact with the rotating rollers are moved along the conveyor belt in the forward direction;
a positioning component coupled to the conveyor belt and configured to halt movement of the object with respect to the conveyor belt; and
a roller-engagement surface positioned adjacent the conveyor belt and configured to engage the rollers to rotate the rollers, the roller-engagement surface being configured to move in a rearward direction opposite from the forward direction of belt travel.

21. The conveyor of claim 20, wherein:
the conveyor belt is configured to move at a first speed relative to the ground; and
the roller-engagement surface is configured to move at speed that is greater than zero, such that the rotating rollers move objects at a second speed that that is more than twice the first speed relative to the ground.

* * * * *